US011700141B2

(12) United States Patent
Mo et al.

(10) Patent No.: US 11,700,141 B2
(45) Date of Patent: Jul. 11, 2023

(54) CONTROL AND/OR REGISTRATION OF SMART DEVICES, LOCALLY BY AN ASSISTANT CLIENT DEVICE

(71) Applicant: Google LLC, Mountain View, CA (US)

(72) Inventors: Vincent Mo, Sunnyvale, CA (US); Kyle Lund, Palo Alto, CA (US); Manit Limlamai, Mountain View, CA (US); Stephen Lanham, Oakland, CA (US); Jun Yang, Cupertino, CA (US); Matthew Swartwout, Mountain View, CA (US); Mark Spates, IV, San Francisco, CA (US); David Roy Schairer, San Jose, CA (US); Gaurav Nolkha, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 127 days.

(21) Appl. No.: 16/956,825

(22) PCT Filed: Oct. 8, 2019

(86) PCT No.: PCT/US2019/055177
§ 371 (c)(1),
(2) Date: Jun. 22, 2020

(87) PCT Pub. No.: WO2020/076816
PCT Pub. Date: Apr. 16, 2020

(65) Prior Publication Data
US 2020/0412566 A1    Dec. 31, 2020

Related U.S. Application Data

(60) Provisional application No. 62/742,826, filed on Oct. 8, 2018.

(51) Int. Cl.
*H04L 12/28* (2006.01)
*G06F 3/16* (2006.01)
(Continued)

(52) U.S. Cl.
CPC .......... *H04L 12/282* (2013.01); *G06F 3/0488* (2013.01); *H04B 17/318* (2015.01);
(Continued)

(58) Field of Classification Search
None
See application file for complete search history.

(56) References Cited

U.S. PATENT DOCUMENTS 9,454,251 B1 * 9/2016 Guihot .................... G06F 3/041
9,680,646 B2 * 6/2017 Nadathur ............ H04L 63/0884
(Continued)

FOREIGN PATENT DOCUMENTS

CN    101448213    6/2009
CN    104426750    3/2015
(Continued)

OTHER PUBLICATIONS

Intellectual Property India; Examination Report issued in Application No. 202027054383; 6 pages; dated Sep. 15, 2021.
(Continued)

*Primary Examiner* — Gennadiy Tsvey
(74) *Attorney, Agent, or Firm* — Gray Ice Higdon

(57) ABSTRACT

Various implementations relate to generating, locally at an assistant client device, specific control commands that, when transmitted to a corresponding smart device, are directly interpretable by the corresponding smart device to effectuate a state change at the corresponding smart device, or at a corresponding additional smart device directly controlled by the corresponding smart device. Various implementations additionally or alternatively relate to utilizing local assistant
(Continued)

client devices in discovering, provisioning, and/or registering smart devices for an account of a user.

16 Claims, 8 Drawing Sheets

(51) Int. Cl.
  *H04B 17/318* (2015.01)
  *H04W 4/80* (2018.01)
  *G06F 3/0488* (2022.01)
  *H04W 24/08* (2009.01)
  *G16Y 10/80* (2020.01)

(52) U.S. Cl.
  CPC .......... *H04L 12/2816* (2013.01); *H04W 4/80* (2018.02); *H04W 24/08* (2013.01); *G06F 3/167* (2013.01); *G16Y 10/80* (2020.01)

(56) References Cited

U.S. PATENT DOCUMENTS

| | | | | |
|---|---|---|---|---|
| 9,948,523 | B2* | 4/2018 | Won | H04W 4/80 |
| 10,075,334 | B1 | 9/2018 | Kozura et al. | |
| 10,659,445 | B2* | 5/2020 | Ha | H04W 4/08 |
| 11,109,425 | B2* | 8/2021 | Zhang | F21V 23/045 |
| 2004/0133704 | A1* | 7/2004 | Krzyzanowski | H04L 12/2836 |
| | | | | 709/227 |
| 2006/0067209 | A1 | 3/2006 | Sheehan et al. | |
| 2006/0242677 | A1* | 10/2006 | Kostadinovich | H04N 7/181 |
| | | | | 348/E7.086 |
| 2008/0183316 | A1* | 7/2008 | Clayton | G05B 11/01 |
| | | | | 700/90 |
| 2009/0083234 | A1* | 3/2009 | Yeom | H04L 67/14 |
| 2012/0331156 | A1 | 12/2012 | Colpitts et al. | |
| 2014/0180447 | A1* | 6/2014 | Chen | H04L 12/6418 |
| | | | | 700/90 |
| 2014/0304430 | A1* | 10/2014 | Salley | G06F 13/102 |
| | | | | 710/10 |
| 2015/0087278 | A1* | 3/2015 | Kim | H04L 63/062 |
| | | | | 455/414.1 |
| 2015/0222517 | A1* | 8/2015 | McLaughlin | H04L 9/006 |
| | | | | 713/171 |
| 2015/0304703 | A1 | 10/2015 | Liu et al. | |
| 2015/0351145 | A1* | 12/2015 | Burks | H04L 63/102 |
| | | | | 455/41.3 |
| 2016/0088424 | A1* | 3/2016 | Polo | H04W 88/04 |
| | | | | 455/41.1 |
| 2017/0006533 | A1* | 1/2017 | Gould | H04L 61/4511 |
| 2017/0180531 | A1* | 6/2017 | Hou | H04L 67/75 |
| 2017/0242557 | A1* | 8/2017 | Rotschield | H04L 12/2816 |
| 2017/0359190 | A1* | 12/2017 | Nadathur | H04W 84/18 |
| 2018/0276962 | A1* | 9/2018 | Butler | G08B 13/19669 |
| 2018/0376317 | A1* | 12/2018 | Kim | H04L 69/24 |
| 2019/0037419 | A1* | 1/2019 | Knaappila | H04W 40/12 |
| 2019/0064762 | A1* | 2/2019 | Pognant | G06F 8/30 |
| 2019/0097832 | A1* | 3/2019 | Pognant | H04L 41/0843 |
| 2019/0179610 | A1* | 6/2019 | Aiken | G10L 15/22 |
| 2020/0044884 | A1* | 2/2020 | Pognant | H04L 12/2834 |
| 2020/0081856 | A1* | 3/2020 | Kojima | F24F 11/30 |

FOREIGN PATENT DOCUMENTS

| | | | | |
|---|---|---|---|---|
| CN | 105594201 | | 5/2016 | |
| CN | 106027542 | A * | 10/2016 | |
| CN | 107771399 | | 3/2018 | |
| JP | 2016012896 | | 1/2016 | |
| WO | WO-2015200689 | A1 * | 12/2015 | G08C 17/02 |
| WO | 2020076816 | | 4/2020 | |

OTHER PUBLICATIONS

European Patent Office; Communication pursuant to Article 94(3) issued in Application No. 19791436.9; 8 pages; dated Oct. 21, 2021.
European Patent Office; International Search Report and Written Opinion of Ser. No. PCT/US2019/055177; 21 pages; dated Jan. 17, 2020.
China National Intellectual Property Administration; Notification of First Office Action issued in Application No. 201980043319.3; 13 pages; dated Oct. 26, 2021.
Japanese Patent Office; Notice of Reasons for Rejection issued in Application No. 2020-569735; 10 pages; dated Dec. 24, 2021.
Trung Nguyen et al.; A Miniature Smart Home Testbed for Research and Education; IEEE 7th Annual International Conference on Cyber Technology in Automation, Control, and Intelligent Systems; 6 pages; dated Aug. 4, 2017.
Xi Zheng; Research and Implementation of Mobile Smart Home System based on WiFi; 88 pages; dated Mar. 15, 2017.
Chinese Patent Office; Notification for Patent Registration Formalities issued in Application No. 201980043319.3, 4 pages, dated Mar. 3, 2022.
Japanese Patent Office; Notice of Allowance issued in Application No. 2020-569735, 3 pages, dated Jun. 13, 2022.

* cited by examiner

CONTROL AND/OR REGISTRATION OF SMART DEVICES, LOCALLY BY AN ASSISTANT CLIENT DEVICE

BACKGROUND

Humans can engage in human-to-computer interactions with interactive software applications referred to herein as "automated assistants". For example, a human (which when interacting with an automated assistant may be referred to as a "user") may provide an input to the automated assistant that can cause the automated assistant to generate and provide responsive output, to control one or more smart devices, and/or to perform one or more other functionalities. The input provided by the user can be, for example, a touch input (e.g., via a touchscreen), a gesture (e.g., detected via a camera), and/or a spoken natural language input (i.e., utterance detected via microphone(s)), which may in some cases be converted into text (or other semantic representation) and then further processed.

In many cases, automated assistants include automated assistant clients that are executed locally by assistant client devices and that are engaged with directly by users, as well as cloud-based counterpart(s) that leverage the more robust resources of the cloud to help automated assistant clients respond to users' inputs. For example, an automated assistant client can provide, to the cloud-based counterpart(s), an audio recording of a spoken utterance of a user (or a text conversion thereof), and optionally data indicative of the user's identity (e.g., credentials). The cloud-based counterpart may perform various processing on the query to return result(s) to the automated assistant client, which may then provide corresponding output to the user.

Many users may engage automated assistants using multiple client devices. For example, some users may possess a coordinated "ecosystem" of client devices such as one or more smart phones, one or more tablet computers, one or more vehicle computing systems, one or wearable computing devices, one or more smart televisions, one or more standalone assistant-centric interactive speakers, one or more standalone assistant-centric interactive displays with speaker(s), among other client devices. A user may engage in human-to-computer dialog with an automated assistant using any of these client devices (assuming an automated assistant client is installed). In some cases these client devices may be scattered around the user's primary residence, secondary residence, workplace, and/or other structure(s). For example, mobile client devices such as smart phones, tablets, smart watches, etc., may be on the user's person and/or wherever the user last placed them. Other client devices, such as traditional desktop computers, smart televisions, and standalone assistant-centric devices may be more stationary, but nonetheless may be located at various places (e.g., rooms) within the user's home or workplace.

Techniques exist to enable user(s) (e.g., a single user, multiple users in a family, co-workers, co-inhabitants, etc.) to utilize an automated assistant client of any one of a coordinated ecosystem of client devices to control any one of a plurality of smart devices that are associated with the automated assistant client. For example, a user can issue a spoken command of "turn off the living room lights" to an automated assistant client of a client device to cause corresponding smart devices (i.e., lights linked to the automated assistant client and labeled as "living room" lights) to be turned off.

In controlling a smart device responsive to user input received at a client device, many existing techniques transmit, via the Internet, data corresponding to the user input, to remote automated assistant server(s). The remote automated assistant server(s) process the data to determine a smart device to be controlled based on the request, and transmit, via the Internet, a request to server(s) of a separate party associated with the smart device (e.g., a manufacturer of the smart device). The server(s) of the separate party receive the request, then transmit, via the Internet, corresponding command(s) to the smart device, whether through a hub co-present with the smart device (e.g., in the case of BLE, Z-Wave, ZigBee, etc.) or to the smart device directly via an IP connection (e.g., in the case of Wi-Fi and other smart devices which don't require a hub). However, such techniques present drawbacks such as high latency, low reliability, and/or excessive consumption of network resources. For example, high latency can be a result of the transmission of the request from the remote assistant server(s) to the separate party server(s), which is often exacerbated by the remote assistant server(s) and separate party server(s) not being geographically proximate to one another. Also, for example, low reliability can be due to the separate party server(s) failing to respond due to, for instance, server outages, network losses, etc. Further, such techniques can burden computational and/or network resources.

Other approaches for control of smart devices can also present drawbacks. For example, some techniques can utilize a central hub that utilizes only one or more standard protocols. However, such standard protocols can fail for unspecified corners of the standard protocols, can fail for smart devices that fail to fully conform to a standard protocol, fail for smart devices that fail to adhere to any standard protocol, and/or can inhibit finer grained control of smart devices by smart device manufacturers, thereby leading to suboptimal performance of the smart devices. Further, firmware updates of the smart devices can break integration with the central hub. Yet further, failure of the central hub and/or poor signals quality from placement of the central hub can lead to inability of the central hub to locally control various smart devices.

SUMMARY

Various implementations described herein relate to generating, locally at an assistant client device, specific control commands that, when transmitted to a corresponding smart device, are directly interpretable by the corresponding smart device to effectuate a state change at the corresponding smart device, or at a corresponding additional smart device directly controlled by the corresponding smart device. In some of those various implementations, the assistant client device locally stores a plurality of third-party (3P) adapters and/or a first-party (1P) adapter. A third-party or 3P, as used herein, references a party that is distinct from the party that controls an automated assistant being referenced. A first-party or 1P, as used herein, references the party that controls the automated assistant being referenced.

Each of the adapters can be provided by a corresponding party and, when executed by the assistant client device, can process generic smart device control commands to generate specific control commands that are each tailored, when locally transmitted to at least one corresponding smart device of the party, to be directly interpretable by the corresponding smart device to effectuate a state change at the corresponding smart device, or at a corresponding additional smart device directly controlled by the corresponding smart device (e.g., in the situations where the specific control commands are transmitted to a hub/bridge of the party, that then controls one or more additional smart devices based on the specific control commands). For example, a 3P adapter can be implemented by 3P provided JavaScript (or other interpreted programming language) and can translate generic smart device control commands into specific control commands that conform to a protocol suite of the 3P. Generic smart device control commands, as used herein, can reference commands that convey smart device(s) and state(s) to be altered at the smart device(s), but that, if transmitted to the smart device(s) would not cause the state(s) to be altered. The generic smart device control commands can conform to a schema of the automated assistant. For example, the generic smart device control command can be a structured command that defines an intent (e.g., turn on/off, dim, increase, decrease), defines a smart device (e.g., a unique identifier of the smart device), defines a third-party for the smart device (e.g., a unique identifier for the third-party), and/or one or more further parameters for the intent (e.g., how much to dim, what to increase/decrease, etc.). The 3P adapter can execute in a container within the automated assistant client, can process generic smart device control commands as described, and can further optionally report events to the automated assistant client using the schema of the automated assistant (i.e., translating from 3P specific event formats to the automated assistant schema).

Each of the adapters can be assigned, locally at the assistant client device, to at least one corresponding communication channel, of two or more communication channels available at the assistant client device. For example, a first 3P adapter can be assigned to a Bluetooth radio channel, of the available communication channels, and, as a result, the Bluetooth radio channel can be utilized for transmitting specific control commands generated by the first 3P adapter. Also, for example, a second 3P adapter can be assigned to a Wi-Fi radio channel, of the available communication channels, and, as a result, the Wi-Fi radio channel can be utilized for transmitting specific control commands generated by the second 3P adapter. Also, for example, a third 3P adapter can be assigned to a low-rate wireless personal area network radio channel, of the available communication channels, and, as a result, that channel can be utilized for transmitting specific control commands generated by the second 3P adapter. As yet another example, a fourth 3P adapter can be assigned to both a Bluetooth radio channel and a Wi-Fi radio channel, and, as a result specific control commands can be transmitted over either (or both) of the channels. Optionally, the same specific control command can be transmitted over either channel to effectuate the same control of a given 3P smart device (that can receive control commands via either channel). While each communication channel can utilize a different radio (or a different subset of radios), it is noted that a given radio can optionally be utilized to transmit via any one of multiple available protocol suites. For example, a Wi-Fi radio channel can be utilized to transmit data using TCP, using UDP, or using variations thereof (e.g. variations in one or more layers of TCP or UDP, such as an application layer).

While each 3P adapter is assigned to a corresponding communication channel of the client device and that corresponding communication channel is utilized to transmit specific control commands generated by the 3P adapter, the 3P adapter can optionally be prevented from directly accessing the corresponding communication channel. Rather, access to the corresponding communication channel can be controlled by the automated assistant client, and the automated assistant client can optionally perform one or more verifications of specific control commands before transmitting the specific control command via the corresponding communication channel. For example, transmission of a specific control command via a corresponding communication channel can be contingent on verification, by the automated assistant client, that the specific control command is addressed to only the smart device(s) identified in a corresponding generic smart device control command for which the specific control command was generated. Such verification can prevent intentional or unintentional control of smart device(s) that are not specified by the generic smart device control command. Additionally or alternatively, such verification can prevent other types of accidental or malicious behavior such as flooding a Bluetooth mesh network with messages to render it inoperable.

Each of the adapters can utilize interpreted programming language to convert generic smart device control commands to corresponding specific control commands that are specific to the adapter. The specific control commands generated by a 3P adapter conform to a protocol suite of the 3P adapter, thereby enabling each of the 3Ps to utilize a standard protocol suite, a variation of the standard protocol suite, and/or their own proprietary protocol suite. For example, a first 3P adapter can generate one or more specific control commands that fully conform to a first protocol suite that is defined as an industry standard. A second 3P adapter can generate one or more specific control commands that include one or more variations to the first protocol suite. For instance, one or more layers of the protocol suite can be adapted by the second 3P such that they differ from, and therefore do not conform with, the corresponding layer(s) of the first protocol suite defined as an industry standard. A third 3P adapter can generate one or more specific control commands that are proprietary to the corresponding 3P, and that do not fully conform to any industry standard protocol suite.

Accordingly, 3P adapters described herein can be tailored, by a corresponding 3P, to a corresponding protocol suite. This enables the assistant client device to transmit corresponding specific control commands, even when they are for unspecified corners of standard protocols, fail to fully conform to a standard protocol, and/or fail to adhere to any standard protocol. Thus, the assistant client device can support local control of a greater quantity of smart devices. Moreover, this enables a 3P to implement a 3P adapter that enables control of corresponding smart device(s), where the control is finer grained than that which would be available utilizing only a standard protocol. This can lead to more optimal local control of the corresponding smart device(s). For instance, this can lead to rendering of light output, from a smart light, that is in greater conformance (e.g., in terms of color or brightness) with a user request, than that available had a standard protocol instead been utilized. Further, the 3P adapters can be updated periodically, on-demand, and/or at other intervals, thereby enabling the corresponding 3Ps to implement 3P adapters that conform to firmware updates of their corresponding smart devices, and preventing errors that would otherwise result if the firmware updates and standard protocols utilized by a central hub were non-compatible. Yet further, local control of various smart devices can be accomplished via any one of a plurality of assistant client devices in a coordinated ecosystem, thereby mitigating connectivity concerns, power failure concerns, or other failure concerns when only a single central smart hub is relied upon to control multiple smart devices.

In some implementations, 3P adapter(s) are downloaded to an assistant client device, from a remote server, responsive to smart device(s) of the 3P(s) being registered for the client device. For example, smart device(s) of a 3P can be registered, locally and/or non-locally, for a user account associated with each of a plurality of assistant client devices and, in response (and optionally during the registration procedure and optionally before full registration), a 3P adapter for the 3P can be pushed to those assistant client devices for local storage of the 3P adapter at those assistant client devices for execution by those client devices. Having the 3P adapter locally stored at the assistant client devices can result in quick execution of the 3P adapter at the client devices (and even preemptive execution as described herein). Moreover, by downloading the 3P adapter responsive to a corresponding 3P smart device being registered (e.g., optionally during the registration procedure), the client devices can store only a subset of available 3P adapters (e.g., only those corresponding to smart devices registered to account(s) of the client device(s)), thereby conserving the often limited local storage space available at assistant client devices by not locally storing one or more (e.g., any) 3P adapters for non-registered smart devices.

Further, in some implementations a 3P adapter can be downloaded to only a subset (e.g., to only one) of a plurality of assistant client devices associated with a user account. In some of those implementations, the 3P adapter is downloaded to those assistant device(s) having the strongest signal strength(s), for a corresponding communication channel, with corresponding 3P smart device(s). For example, a particular 3P adapter that is assigned to a Bluetooth communication channel can be downloaded at a given assistant client device associated with a user account, based on a signal strength for the Bluetooth communication channel, at the given assistant client device and between the given assistant client device and smart device(s) of the 3P, satisfying one or more criteria. For instance, the one or more criteria can include that the signal strength satisfies a threshold, such as being the greatest signal strength, amongst all assistant client device associated with the user account. In such an instance, the particular 3P adapter can optionally be downloaded to the given assistant client device without it being downloaded to any other of the assistant client devices associated with the user account. In these and other manners, different assistant client devices associated with the user account can download different subsets of 3P adapters based on signal strengths and/or other criteria. This can enable the assistant client devices associated with a user account to collectively support a wide variety of 3P adapters, without necessitating storage of each 3P adapter at each of the assistant client devices. This can be particularly beneficial in view of the often limited local storage space available at assistant client devices. For example, absent such techniques a given assistant client device may not have sufficient local storage to store all 3P adapters needed for a user account. However, utilizing such techniques can enable the needed 3P adapters to be intelligently distributed amongst the storage of multiple assistant client devices associated with the user account. In some implementations, data indicating signal strength(s) (if any) each of the assistant client devices associated with a user account can be provided, by those devices, to a remote server or to one or more of the assistant client devices. The server and/or the assistant client device(s) can utilize the data, and one or more criteria (e.g., criteria described above) in determining which assistant client devices should receive which 3P adapters. Corresponding 3P adapters can then be pushed to the corresponding client devices, or data transmitted to the corresponding client devices to cause the corresponding client devices to request or retrieve the corresponding 3P adapters.

Moreover, in some of the implementations where 3P adapter(s) are downloaded to an assistant client device, the assistant client device can optionally preemptively execute one or more (e.g., all) of the locally stored 3P adapters. Preemptively executing a 3P adapter, as used herein, references executing the 3P adapter prior to a generic smart device control command, that is directed to smart device(s) of the corresponding 3P and processed using the executing 3P adapter, being generated. Preemptively executing a 3P adapter on an assistant client device can include at least loading the 3P adapter into in-memory cache of the assistant client device. Pre-emptively executing the 3P adapter can reduce latency (relative to not preemptively executing the 3P adapter) in generating a specific control command using the 3P adapter and, resultantly, in transmitting the specific control command and effectuating a corresponding state change. Thus, state changes at smart devices can be effectuated with reduced latency.

In some implementations, all 3P adapters locally downloaded to an assistant client device are preemptively executed by the client device. In some other implementations, only a subset of the available 3P adapters are preemptively executed at a given time in view of memory constraints, processor constraints, and/or other considerations. In some of those other implementations, the subset that is preemptively executed at the given time can be based on one or more dynamic criteria. The one or more dynamic criteria can include: a corresponding recency of utilization of the particular 3P adapter at the client device; a signal strength, between the client device and the particular smart device corresponding to the particular 3P adapter, for a communication channel; a time of day; and/or a day of the week. For example, the N most recently utilized (i.e., utilized in generating specific control commands) 3P adapters can be executed at a given assistant client device. Also, for example, a particular 3P adapter can be executed at a given assistant client device during one or more temporal periods (e.g., time(s) of day and/or day(s) of the week) based on one or more past occurrences of utilization of the particular 3P adapter during or near those temporal period(s). As yet another example, a particular 3P adapter that is assigned to a Bluetooth communication channel can be preemptively executed at a given assistant client device based on a signal strength for the Bluetooth communication channel, at the given assistant client device and between the assistant client device and smart device(s) of the 3P, satisfying a threshold (e.g., a fixed threshold, or a threshold relative to other assistant client device(s)). It will be appreciated from the preceding and/or other description herein, that at any given time different assistant client devices in an ecosystem can have one or more different preemptively executing adapters based on, for example, one or more criteria that are particularized to those devices. For example, at a given time a first assistant client device can be preemptively executing adapters A, B, C, and D—and a second assistant client device can be preemptively executing adapters C, D, E, and F.

In some implementations, a generic smart device control command is generated responsive to voice input, touch input, triggering of an automated assistant routine, a signal from another non-assistant device, and/or other signal(s). For example, a generic smart device control command identified at a given assistant client device can be generated responsive to voice input received at the given assistant client device. For instance, the given assistant client device can transmit audio data, corresponding to the voice input, to a remote assistant server, and receive, in response, the generic smart device control command (e.g., the remote assistant server can process the voice input to determine it corresponds to the generic smart device control command). Also, for instance, the given assistant client device can itself process the voice input (e.g., using a local voice-to-text processor and/or natural language understanding engine) to locally generate the generic smart device control command. As another example, a generic smart device control command identified at a given assistant client device can be generated responsive to touch input received at the given assistant client device. For example, the given assistant client device can render, on a touch sensitive screen thereof, an interactive graphical interface element for control of smart device(s) (e.g., an on/off element, a dimmer element for smart light(s), a temperature adjustment element for smart thermostat(s), etc.) and can directly interpret interactions with the interactive graphical interface element into corresponding generic smart device control commands. As yet another example, the generic smart device control command can be generated (locally or remotely) responsive to triggering of an automated assistant routine that includes the generic smart device control command. The automated assistant routine can be triggered responsive to detection of voice input that is assigned to the routine (e.g., a shortcut phrase such as "good morning" that triggers a plurality of discrete actions including smart device control action(s)), interaction with a virtual or physical button for the routine, occurrence of certain temporal condition(s), and/or occurrence of other triggering condition(s).

In some implementations, one or more criteria are utilized to select a particular assistant client device, from an ecosystem of available client devices, for generating a specific control command and/or for transmitting the specific control command to corresponding smart device(s). In some of those implementations, the particular assistant client device is selected based on a reliable communications channel being established between the particular assistant client device and the corresponding smart device(s). In some versions of those implementations, the particular assistant client device can be selected based on the communications channel of the particular assistant client device having at least a threshold signal strength with the corresponding smart device(s). For example, the threshold signal strength can be a fixed signal strength, or a signal strength relative to signal strengths of other assistant client devices of the ecosystem. For instance, the particular client device can be selected to control a smart device based on a signal strength, between the particular client device and the smart device via a communications channel for controlling the smart device, being greatest amongst all devices of the ecosystem.

As one example, a generic smart device control command can be identified initially at a first assistant client device, and the generic smart device control command can specify a particular smart device to be controlled. The first assistant client device can determine that a reliable communications channel is not established between it and the particular smart device. For example, the particular smart device can be one to be controlled via a Bluetooth communications channel and the first assistant client device can determine that the particular smart device is not detectable via its Bluetooth radio, or that the signal strength between the first assistant client device and the particular smart device, via the Bluetooth radio, fails to satisfy a threshold. In response, the first assistant client device can transmit the generic smart device control command, over a local network (e.g., Wi-Fi or a mesh network established between assistant client devices) to a second assistant client device that has an established reliable communications channel to the smart device. The second assistant client device can then use a corresponding local adapter to translate the generic smart device control command to a corresponding specific command, and transmit the corresponding specific command to the particular smart device. Alternatively, the first assistant client device can utilize its corresponding local adapter to generate the corresponding specific command, and transmit the corresponding specific command to the second assistant client device, in lieu of transmitting the generic smart device control command.

Continuing with the example, the first assistant client device can optionally rely on a client devices to smart devices mapping, stored locally at the assistant client device, to resolve the second assistant client device as one having an established reliable communications channel to the smart device. The client devices to smart devices mapping can define client devices of the ecosystem and, for each of the assistant client devices, can define corresponding smart device(s) for which the assistant client device has a corresponding reliable communications channel, and can optionally define signal strength(s) between the assistant client device and smart device(s). The mapping can be generated based on corresponding data (e.g., detected device(s), signal strength(s)) reported by the assistant client devices, and can be updated at periodic and/or non-periodic intervals. Remote automated assistant component(s) can optionally receive the corresponding data from the assistant client devices of the ecosystem, update the mapping, and transmit the updated mappings to the assistant client devices of the ecosystem which locally store and locally utilize the mappings. The first assistant client device can initially identify the generic smart device control command based on, for example, corresponding user input being received at the first assistant client device and/or the generic smart device control command being generated locally at the first assistant client device. In some implementations where the generic smart device control command is generated by remote automated assistant component(s), such component(s) can access a client devices to smart devices mapping, and initially address the generic smart device control command to the second assistant client device, thereby causing it to be provided directly to the second assistant client device, without being routed through the first assistant client device.

Various implementations described herein additionally or alternatively relate to utilizing local assistant client devices in discovering, provisioning, and/or registering smart devices for an account of a user. In some implementations, a smart device that is not yet registered can be discovered by causing each assistant client device, of an ecosystem of assistant client devices, to scan one or more communications channels (e.g., Wi-Fi, Bluetooth, and/or other) for smart device(s) that aren't registered. For example, for Wi-Fi, each of the assistant client devices can scan a respective Wi-Fi radio to identify any unregistered device(s), optionally using service set identifiers (SSIDs) and/or basic service set identifiers (BSSIDs) to filter for particular smart devices for which corresponding adapters are available. As another example, for Bluetooth, each of the assistant client devices can scan a respective Bluetooth radio to identify any unpaired smart device(s), optionally utilizing identifier(s) to filter for particular smart devices for which corresponding adapters are available. The discovery can occur at periodic or non-periodic intervals, or in response to a user request (e.g., a voice request, a request initiated via a smart phone app for the assistant, etc.).

Once discovered, a smart device can be provisioned by causing the smart device to pair with at least one of the assistant client devices (e.g., in the case of Bluetooth) and/or to connect to a secured Wi-Fi network to which the assistant client devices are already connected. After provisioning, data transmitted by the smart device can be received, at an assistant client device, and processed using a local adapter of the assistant client device, to generate registration data in a schema of the automated assistant. For example, the data transmitted by the smart device can be in a protocol suite for a corresponding 3P, and can be interpreted by the 3P adapter into a schema for registration with the automated assistant. The registration data can be utilized by the automated assistant to add the smart device to a home graph or other structure that defines smart devices, assistant client devices, and various properties (e.g., name(s), location(s), etc.) of the smart devices and assistant client devices. Optionally, user input can be received via the assistant client device and/or other client device and can be utilized to supplement the registration data. For example, the user input can include one or more user provided aliases for the smart device, to enable storing of those alias(es) in association with the smart device in the home graph.

In some implementations, the local adapter utilized to generate the registration data is specific to the party of the smart device, and is optionally downloaded at the assistant device responsive to the discovery and/or provisioning of the smart device. In some implementations, the smart device is assigned to a home graph (or other structure), based on biometric data, detected via one or more of the assistant devices of the ecosystem, corresponding to an account associated with the home graph. For example, the smart device can be assigned to the home graph (e.g., in lieu of another home graph associated with another account of one or more of the assistant client devices) based on voice data, received during the discovering, provisioning, and/or registering, matching voice authentication data stored in association with the account. For example, the voice data can be based on spoken input provided by the user in requesting a scan and/or in providing alias(es) for a discovered device. Other biometric identification can additionally or alternatively be utilized, such as facial, fingerprint, etc. In some implementations, a registered smart device can be associated (e.g., in a home graph) with those assistant client device(s) that can locally transmit commands to the smart device. For example, if communications with the smart device occur via a short-range radio (e.g., Bluetooth radio), those assistant client devices having at least a corresponding signal strength (for the corresponding connection to the smart device via the short-range radio), can be designated in the home graph, optionally along with a designation of the corresponding signal strengths. Such designations can be used in determining which assistant client device(s) should be utilized in generating and/or transmitting specific control commands to the smart device.

In some implementations, a registered smart device can be automatically (e.g., without any user input, or only confirmatory user input) associated (e.g., in a home graph) with a location that is based on location(s) of assistant client device(s) and signal strength(s) between those assistant client device(s) and the registered smart device. As one example, if a signal strength between the registered smart device and a given assistant client device, having a location of "office" in a home graph, satisfies a threshold and/or is the "strongest" signal strength (amongst all assistant client devices), the registered smart device can be automatically assigned a location of "office" in the home graph. As another example, if the registered smart device has signal strength (s), between it and assistant client device(s), that match (e.g., are within a threshold percentage of) signal strength(s) of other smart device(s) having a "laundry room" location in the home graph, the registered smart device can be automatically assigned a location of "laundry room" in the home graph. For instance, assume an existing smart device in the home graph has a manually labeled location of "laundry room", a first signal strength between it and a first assistant client device, and a second signal strength between it and a second assistant client device. In such an instance, a newly registered smart device that has a third signal strength between it and the first assistant client device that matches (e.g., within 5% of, 10% of, 15% of, or other threshold of) the first signal strength and a fourth signal strength that matches (e.g., within 5% of 10% of, 15% of, or other threshold of) the second signal strength, it can be assumed to have the same "laundry room" location of the existing smart device, and the "laundry room" location automatically assigned in the home graph to the newly registered smart device. Additionally or alternatively, in various implementation(s) signal strength(s) for a smart device can be periodically (or at other regular or non-regular interval(s)) analyzed to determine whether a location of the smart device should be updated in the home graph (or other topology representation). For example, if a smart plug is moved from an "office" to a "living room", such change can be automatically detected and updated. Also, for example, if a battery powered smart device, or a passive smart device is readily movable about an environment, its location changes can be automatically detected and updated. In these and other manners, a location of a smart device can be automatically determined and assigned in a home graph. This can enable the smart device to be controllable responsive to location-specific spoken utterances (e.g., "turn off all devices in the office"), can enable control(s) to be rendered in appropriate locations in a visual interface for control (e.g., placing control(s) for the smart device in an "office" subheading or control group), and/or can enable a location of the smart device to be included in response to certain spoken utterances (e.g., "where is battery powered smart device A located"?).

In some implementations, a smart device is discovered that is broadcasting an access point and that smart device is not yet provisioned as it is not connected to a secured Wi-Fi network utilized by the assistant client devices, and lacks the credentials for connecting to the secured Wi-Fi network. In some of those implementations, each of a plurality of assistant client devices, of the ecosystem of client devices, detected the availability of the access point through scanning of its respective Wi-Fi radio. In some versions of those implementations, a single assistant client device is selected for connecting to the smart device via the access point of the smart device, and securely sharing, with the smart device via the connection, the credentials for connecting to the secured Wi-Fi network. Once the credentials are shared, the smart device connects to the secured Wi-Fi network and can be registered through communications via the Wi-Fi network. In various versions where the single assistant client device is selected, it is selected based at least in part on human interaction data for the single assistant client device. For example, it can be selected based on the human interaction data indicating that no user interface input has been received at the single assistant client device within a threshold amount of time and/or based on the human interaction data indicating that the single assistant client device is utilized less frequently than any other of the plurality of assistant client devices that detected the access point. In these and other manners, the single client device can be selected so that disruption to ongoing and/or forthcoming assistant interactions is prevented, as the single client device will break its connection with the secured Wi-Fi network when connecting to the local access point—and the single client device is selected based on criteria that indicated it is not being used and/or is less likely (than other devices of the ecosystem) to be used.

The above description is provided as an overview of only some implementations of the present disclosure. Further description of those implementations, and other implementations, are described in more detail herein.

In addition, some implementations include one or more processors of one or more computing devices, where the one or more processors are operable to execute instructions stored in associated memory, and where the instructions are configured to cause performance of any of the methods described herein. Some implementations include a client device with one or more processors executing locally stored instructions and interfacing with locally stored data to perform one or more of the methods described herein. Some implementations also include one or more non-transitory computer readable storage media storing computer instructions executable by one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
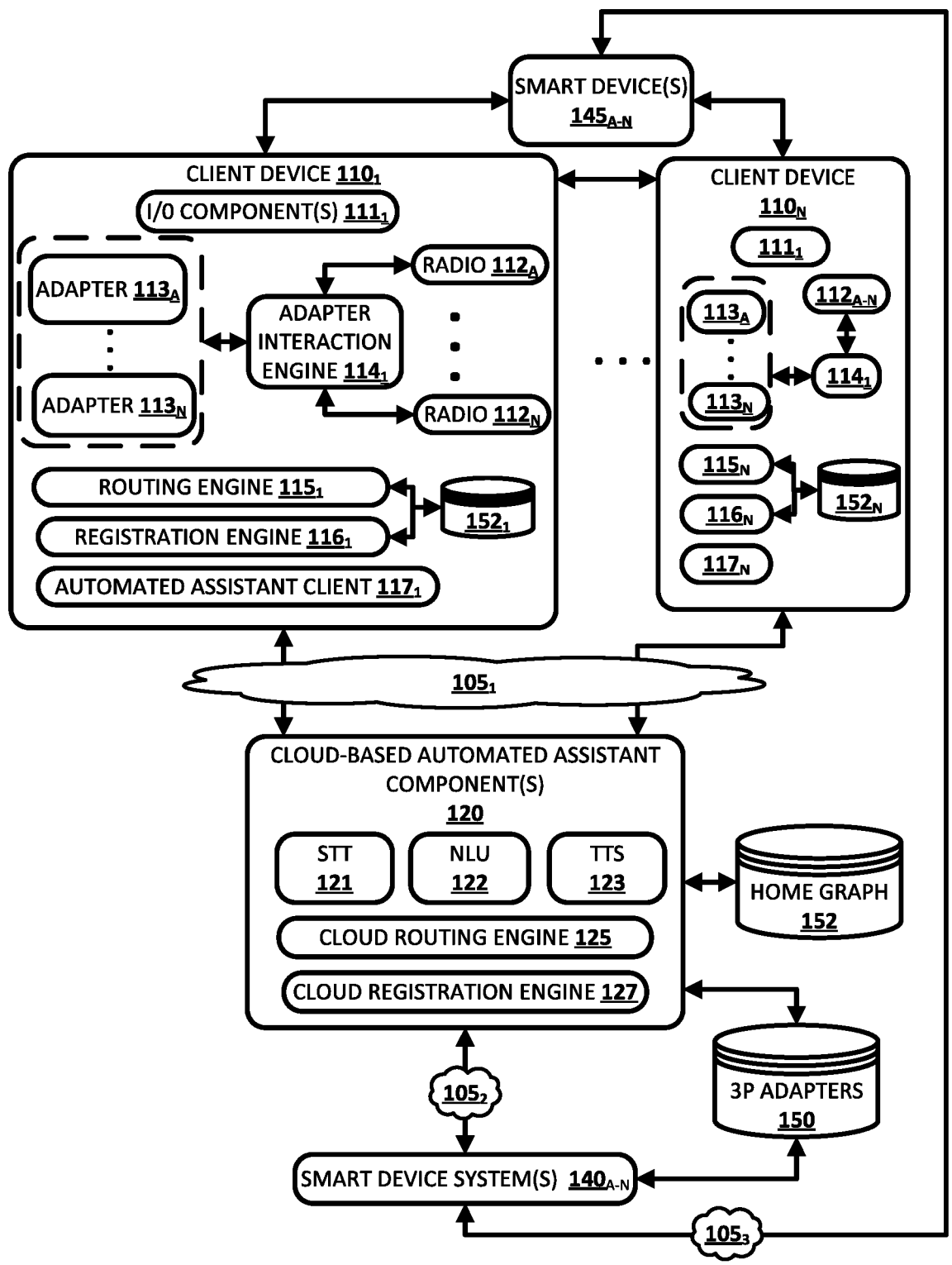
FIG. 1 is a block diagram of an example environment in which implementations disclosed herein may be implemented.

There is a proliferation of smart network connected devices (also referred to herein as smart devices or Internet of Things (IoT) devices) such as smart home alarms, smart door locks, smart cameras, smart lights, smart thermostats, smart weight scales, smart beds, smart irrigation systems, smart garage door openers, smart plugs, smart appliances, smart baby monitors, smart fire alarms, smart moisture detectors, etc. Often, multiple smart devices are located within the confines of a structure, such as a home—or located within multiple related structures, such as a user's primary residence and the user's secondary residence and/or work location.

Further, there is a proliferation of assistant client devices that each include an assistant client that can optionally interact with one or more remote automated assistant components to form a logical instance of an automated assistant. An assistant client device can be devoted solely to assistant functionality (e.g., a standalone speaker and/or standalone audio/visual device including only an assistant client and associated interface, and devoted solely to assistant functionality) or can perform assistant functionality in addition to other functions (e.g., a mobile phone or tablet that includes an assistant client as one of multiple applications). Moreover, some smart devices can also be assistant client devices. For example, some smart devices can include an assistant client and at least speaker(s) and/or microphone(s) that serve (at least in part) as user interface output and/or input devices for an assistant interface of the assistant client.

Various techniques have been proposed for associating smart devices with corresponding logical instances of automated assistants (and optionally with individual assistant client devices). For example, a user, group of users, an assistant client device, and/or a group of assistant client devices (e.g., all within a structure) can be linked (e.g., in one or more databases) with a plurality of disparate smart devices to enable interaction with (e.g., control of) the smart devices via automated assistants. For instance, each of multiple assistant client devices in a household can be linked to each of multiple disparate smart devices in the household to enable any user (or a restricted group of users) to interface with any one of the assistant client devices to interact with any one of the multiple disparate smart devices.

One example of such linking is a device topology representation (also referred to herein as a "home graph") that can be user created, and/or automatically created, and that may define various assistant client devices, various smart devices, identifier(s) for each, and/or attribute(s) for each. For example, the identifier(s) for a device can specify a room (and/or other area(s)) of a structure in which the device is located (e.g., living room, kitchen) and/or can specify nickname(s) and/or alias(es) for the device (e.g. couch lamp, front door lock, bedroom speaker, kitchen assistant, etc.). In this manner, the identifiers of devices can be names, aliases, and/or locations of the respective devices that the user is likely to associate with the respective devices.

The device topology representation can further specify one or more device attributes associated with the respective devices. The device attributes for an assistant client device can be, for example, associated with one or more input and/or output modalities supported by the assistant client device. For instance, a device attribute for a standalone speaker-only assistant client device can indicate that it is capable of providing audible output, but incapable of providing visual output. The device attributes of a smart device can, for example, identify one or more states, of the smart device, that can be controlled; identify a party (e.g., a 3P) that manufactures, distributes, and/or creates the firmware for the smart device; and/or identify a unique identifier for the smart device, such as a 1P or 3P provided fixed identifier.

According to various implementations disclosed herein, the device topology representation can optionally further specify: which smart devices can be controlled locally by which assistant client devices; local addresses for locally controllable smart devices (or local addresses for hubs that can directly locally control those smart devices); local signal strengths and/or other preference indicators between assistant client devices and smart devices. Further, according to various implementations disclosed herein, the device topology representation (or a variation thereof) can be locally stored at each of a plurality of assistant client devices for utilization in locally controlling and/or locally registering smart devices.

Now turning to FIG. 1, an example environment in which techniques disclosed herein may be implemented is illustrated. The example environment includes a plurality of client computing devices $110_{1-N}$ (also referred to herein simply as "client devices"), cloud-based automated assistant components 120, smart device systems $140_{A-N}$, smart devices $145_{A-N}$, 3P adapters database 150, and a home graph 152 for a user of the client devices $110_{1-N}$. The client devices $110_{1-N}$ and smart devices $145_{1-N}$ of FIG. 1 represent client devices and smart devices that are at least selectively associated with one another (e.g., via the home graph 152 and/or other device topology). For example, the smart devices $145_{1-N}$ can all be at a home (e.g., in the interior and/or exterior of the home), the client devices $110_{1-N}$ can be at least occasionally in the same home, and the smart devices $145_{1-N}$ and the client devices $110_{1-N}$ can be linked to one another utilizing one or more techniques, such as those described herein. Through such linking, the client devices $110_{1-N}$ can be utilized to locally control the smart devices $145_{1-N}$ according to implementations described herein.

One or more (e.g., all) of the client devices $110_{1-N}$ can execute a respective instance of an automated assistant client $117_{1-N}$. However, in some implementations one or more of the client devices $110_{1-N}$ can optionally lack an instance of an automated assistant client $117_{1-N}$, and still include engine(s) and hardware components for locally controlling and/or registering one or more smart devices (e.g., an adapter interaction engine, adapter(s), radio(s), routing engine, and/or a registration engine). An instance of the automated assistant client $117_{1-N}$ can be an application that is separate from an operating system of the corresponding client device $110_{1-N}$ (e.g., installed "on top" of the operating system)—or can alternatively be implemented directly by the operating system of the corresponding client device $110_{1-N}$. As described further below, each instance of the automated assistant client $117_{1-N}$ can optionally interact with cloud-based automated assistant component(s) 120 in responding to various requests provided by a user via I/O components 111 of any one of the client devices $110_{1-N}$. Further, and as also described below, other engine(s) of the client devices $110_{1-N}$ can optionally interact with cloud-based automated assistant component(s) 120.

One or more cloud-based automated assistant components 120 can be implemented on one or more computing systems (collectively referred to as a "cloud" or a "remote" computing system) that are communicatively coupled to client devices $110_{1-N}$ via one or more wide area networks (e.g., the Internet), indicated generally by $105_1$ of FIG. 1. For example, cloud-based automated assistant component(s) 120 can be implemented by one or more clusters of high-performance servers. It is noted that the client devices $110_{1-N}$ can utilize one or more local area networks in accessing the wide-area networks $105_1$ and/or in locally communicating with one another. Such local area networks can include a Wi-Fi network and/or a mesh network between the client devices $110_{1-N}$.

The cloud-based automated assistant components 120 can also be communicatively coupled with smart device systems $140_{A-N}$ via one or more wide area networks. The communicative coupling of the cloud-based automated assistant components 120 with the smart device systems 140 is indicated generally by $105_2$ of FIG. 1. Further, the smart device systems 140 can each be communicatively coupled to a corresponding group of one or more smart devices $145_{A-N}$ via one or more wide area networks, indicated generally by $105_3$ of FIG. 1. It is noted that the smart devices $145_{A-N}$ can utilize one or more local area networks in accessing the wide-area networks $105_3$.

Each of the smart device systems $140_{A-N}$ can be either a 1P or a 3P system, and each can be communicatively coupled with one or more corresponding smart devices $145_{A-N}$. For example, a first smart device system $140_{A-N}$ can be controlled by a first 3P and communicatively coupled with a first smart device $145_{A1}$, a second smart device system 140 can be controlled by a second 3P and communicatively coupled with a second smart device $145_{B1}$ and a third smart device $145_{B2}$, etc.

The smart device systems 140 can communicate with the devices $145_{A-N}$ via the wide-area networks $105_3$ to control their respective smart devices $145_{A-N}$, to deliver firmware updates to their respective smart devices $145_{A-N}$, to ascertain the status of their respective smart devices $145_{A-N}$, etc. For example, a given one of the smart device systems 140 can communicate with one of the smart devices $145_{A-N}$ to control the smart device in response to user input being received via a mobile application, for the smart device system, that enables control of the smart device.

Also, for example, a given one of the smart device systems 140 can communicate with one of the smart devices $145_{A-N}$ to control the smart device in response to a request from cloud-based automated assistant component(s) 120. For example, according to some techniques a user can provide, via one or more I/O components $111_1$ of a client device $110_1$, a request to control a smart device, such as spoken input of "turn off the couch light" provided via microphone(s) of I/O components $111_1$. The request (e.g., the spoken input or a conversion thereof) can be transmitted by the automated assistant client $117_1$ of the client device $110_1$, to the cloud-based automated assistant component(s) 120 via the wide-area networks $105_1$. The cloud-based automated assistant component(s) 120 can process the request to determine a smart device to be controlled based on the request, and transmit, via the wide-area networks $105_2$, a request to a respective one of the smart device systems $140_{A-N}$ which, in turn transmits, via wide-area networks $105_3$, corresponding command(s) to the smart device. However, as described herein such techniques present drawbacks such as high latency, low reliability, and/or excessive consumption of network resources.

While implementations disclosed herein can still utilize such techniques for some smart device control requests and/or in some situations, various implementations disclosed herein can at least selectively bypass, in controlling a smart device, communications between the cloud-based automated component(s) 120 and a respective one of the smart device system(s) 140 and/or communication(s) between the smart device system(s) 140 and the smart device. Rather, those various implementations generate, locally at one of the client devices $110_{1-N}$, specific control commands that are transmitted locally (e.g., via a local-areanetwork or a local peer-to-peer connection) to smart device(s) to effectuate a desired state change at the smart device(s). This can mitigate the high latency, low reliability, excessive consumption of network resources, and/or other drawbacks of the above-mentioned techniques.

In some implementations, the plurality of client computing devices $110_{1-N}$ and smart devices $145_{A-N}$ can be associated with each other in various ways in order to facilitate performance of techniques described herein. For example, in some implementations, the plurality of client devices $110_{1-N}$ and smart devices $145_{A-N}$ may be associated with each other by virtue of being communicatively coupled via one or more LANs and/or via one or more peer-to-peer networks. This may be the case, for instance, where plurality of client computing devices $110_{1-N}$ are deployed across a particular area or environment, such as a home, a building, and so forth. Additionally or alternatively, in some implementations, plurality of client devices $110_{1-N}$ and smart devices $145_{A-N}$ may be associated with each other by virtue of them being members of a coordinated ecosystem of client devices $110_{1-N}$ and smart devices $145_{A-N}$ that are at least selectively accessible by one or more users (e.g., an individual, a family, employees of an organization, other predefined groups, etc.). In some of those implementations, the ecosystem of client devices $110_{1-N}$ and smart devices $145_{1-N}$ can be manually and/or automatically associated with each other in the home graph 152 and/or other device topology. For example, one or more of the client devices $110_{1-N}$ and smart devices $145_{1-N}$ can be associated with one another through registration techniques described herein.

An instance of an automated assistant client $117_{1-N}$, by way of its interactions with one or more cloud-based automated assistant components 120, may form what appears to be, from a user's perspective, a logical instance of an automated assistant with which the user may engage in a human-to-computer dialog. For example, a user can engage with the same logical instance of an automated assistant using either client device $110_1$ and automated assistant client $117_1$ or using client device $110_N$ and automated assistant client $117_N$. While the particular instances of the automated assistant client $117_1$ and $117_N$ can vary and/or can provide user interface output via different I/O components $111_1$ and $111_N$ and/or accept different user interface input via different I/O components $111_1$ and $111_N$ (e.g., I/O components $111_1$ can include a touch-screen, while I/O components $111_N$ do not), the user may still effectively engage with the same logical instance of the automated assistant. For the sakes of brevity and simplicity, the term "automated assistant", as used herein will refer to the automated assistant client 117 executing on a client device 110 and optionally to one or more cloud-based automated assistant components 120 (which may be shared amongst multiple automated assistant clients 117). Although two client devices $110_1$ and $110_N$ of a coordinated ecosystem are illustrated in FIG. 1, it is understood that many additional client devices can be included in the ecosystem. Further, it is understood that separate coordinated ecosystems of client devices will also be provided, each associated with different user(s) (e.g., account(s)) and/or environments, and that such separate coordinated ecosystems can also interact with cloud-based automated assistant component(s) 120 (but with interactions tailored to the account(s) of those separate ecosystems).

The client devices $110_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone assistant-centric interactive speaker, a standalone assistant-centric interactive display with speaker(s), a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

As mentioned above, one or more of the client devices $110_{1-N}$ can optionally include a respective instance of an automated assistant client $117_{1-N}$. The automated assistant clients $117_{1-N}$ can each process user inputs received from input device(s) of respective I/O components $111_{1-N}$, such as spoken inputs detected via microphone(s) of I/O components $111_{1-N}$, touch inputs received via touch-screen displays of I/O components $111_{1-N}$, images detected via camera(s) of I/O components $111_{1-N}$, etc. Further, each of the automated assistant clients $117_{1-N}$ can optionally render various outputs via output device(s) of respective I/O components $111_{1-N}$, such as speaker(s) and/or touch-screen displays of I/O components $111_{1-N}$.

In various implementations, one or more instances of the automated assistant client $117_{1-N}$ can interface with the cloud-based automated assistant component(s) 120 in processing inputs and/or in generating outputs based on the inputs and/or in generating smart device control commands based on the inputs. For example, automated assistant client $117_1$ can transmit, to cloud-based automated assistant components 120, audio data corresponding to spoken input received after invocation of the automated assistant client $117_1$ at the client device $110_1$. The invocation of the automated assistant client $117_1$ at the client device $110_1$ can be based on detecting an invocation phrase (e.g., "OK Assistant"), interaction of a hardware button or graphical button that invokes the automated assistant client $117_1$, in response to a gesture detected via a camera of the I/O components $111_1$, and/or other invocation signal(s). The cloud-based automated assistant components 120 can convert the audio data to text using speech-to-text (STT) processor 121, and perform natural language understanding (NLU) on the text using NLU engine 122 to determine an appropriate response. For example, the appropriate response can be a textual response that can optionally be converted to generated speech using text-to-speech (US) processor, and transmitted to the automated assistant client $117_1$ for rendering of the generated speech via speaker(s) of the I/O components $111_1$.

As another example, the appropriate response can be a generic smart device control command, such as a structured command that defines an intent (e.g., turn on/off, dim, increase, decrease), defines a smart device (e.g., a unique identifier of the smart device), defines a third-party for the smart device (e.g., a unique identifier for the third-party), and/or one or more further parameters for the intent (e.g., how much to dim, what to increase/decrease, etc.). The generic smart device control command can be transmitted to the assistant client $117_1$, or another assistant client of another client device 110, for local implementation of the generic smart device control command. In some implementations and/or for some assistant clients $117_{1-N}$, the assistant client can include a local STT processor, local NLU engine, and/or other component(s) for locally processing received inputs, without necessitating interfacing with cloud-based automated assistant component(s) 120. For example, assistant client $117_1$ can include one or more local component(s) for locally generating generic smart device control commands, without interfacing with cloud-based automated assistant component(s) 120.

One or more of the client devices 110 also optionally includes a respective adapter interaction engine $114_{1-N}$, one or more respective locally stored adapters $113_{A-N}$, and one or more respective available radios $112_{A-N}$. The same adapters $113_{A-N}$ and available radios $112_{A-N}$ can optionally be locally provided on each of the client devices $110_{1-N}$, or the adapters $113_{A-N}$, and/or radios $112_{A-N}$ can optionally vary among client devices $110_{1-N}$. Further, as described herein, one or more of the adapters $113_{A-N}$ can be preemptively executed at a client device $110_{1-N}$, and which adapters are preemptively executing at a given time for a given client device $110_{1-N}$ can be based on one or more criteria, such as historical usage of the client device, temporal criteria, etc.

Further description of adapter interaction engines $114_{1-N}$ and locally stored adapters $113_{A-N}$ is now provided with reference to client device $110_1$. A generic smart device control command can be passed from the automated assistant client $117_1$ to the adapter interaction engine $114_1$. Although illustrated separately in FIG. 1 for clarity, it is noted that in various implementations adapter interaction engine $114_1$, adapters $113_{A-N}$, routing engine $115_1$, and/or registration engine $116_1$ can logically be incorporated as part of automated assistant client $117_1$. The generic smart device control command can be generated responsive to voice input, touch input, triggering of an automated assistant routine, a signal from another non-assistant device, and/or other signal(s). For example, the generic smart device control command can be generated responsive to voice input received at the client device $110_1$. For instance, the automated assistant client $117_1$ can transmit audio data, corresponding to the voice input, to remote automated assistant component(s) 120, and receive, in response, the generic smart device control command. Also, for instance, the automated assistant client $117_1$ can itself process the voice input to locally generate the generic smart device control command. As another example, automated assistant client $117_1$ can render, on a touch sensitive screen of I/O components $111_1$, an interactive graphical interface element for control of smart device(s) and can directly interpret interactions with the interactive graphical interface element into corresponding generic smart device control commands. The generic smart device control command can be a structured command that defines an intent, defines smart device(s) to be controlled, optionally defines a third-party for the smart device, and/or one or optionally one or more further parameters for the intent.

The adapter interaction engine $114_1$ can select, based on the generic smart device control command, a corresponding one of the adapters $113_{A-N}$ based on that adapter being provided by a party that corresponds to the generic smart device control command. The adapter interaction engine $114_1$ provides the generic smart device control command to the selected one of the adapters $113_{A-N}$, which processes the generic smart device control command to generate specific control commands that are directly interpretable by corresponding smart device(s) to effectuate state change(s) at the corresponding smart device(s), or at corresponding additional smart device(s) directly controlled by the corresponding smart device. In various implementations, each of adapters $113_{A-N}$ is implemented by JavaScript (or other interpreted programming language) provided by a party corresponding to the adapter, and each of the adapters $113_{A-N}$ can translate generic smart device control commands into specific control commands that conform to a protocol suite of the party. Each of adapters $113_{A-N}$ can be sandboxed, executing within a container within the client device $110_1$ or the automated assistant client $117_1$, can process generic smart device control commands as described, and can further optionally report events to the automated assistant client $117_1$ using the schema of the automated assistant. The adapters $113_{A-N}$ can be transmitted to the client device $110_1$ by the cloud-based automated assistant component(s) 120, which can select the adapters $113_{A-N}$ from 3P adapters database 150. The adapters of 3P adapters database 150 can be updated by smart device systems $140_{A-N}$ (e.g., to conform to firmware updates and/or to improve functionality) and updated adapters pushed to the client device $110_1$. In some implementations, additional adapter(s) can be provided and utilized to process certain generic smart device control commands, optionally for certain smart device(s). For example, a given additional adapter can be utilized to process certain generic smart device control commands, and generate corresponding specific control commands that are common for multiple 3P protocol suites (e.g., common to an industry standard base protocol to which the 3P protocol suite(s) conform or are variations). For instance, a generic wake-on-lan (WOL) command can be processed using the given additional adapter to generate a specific WOL control command that is applicable to all protocol suites that are variation(s) of the IP protocol industry standard. In these and other manners, additional adapter(s) can be utilized to process certain generic smart device control command(s) (e.g., for smart devices of multiple 3Ps), while 3P specific adapter(s) can be utilized to process certain other generic smart device control command(s).

The generated specific control commands are provided to the adapter interaction engine $114_1$. The adapter interaction engine $114_1$ selects one of the radios $112_{A-N}$ for locally transmitting the specific control command to effectuate alteration of state(s) of the smart device(s) indicated by the specific control command (and the generic smart device control command on which the specific control command is based). The adapter interaction engine $114_1$ can select the radio based on it being assigned, locally, to the party and/or adapter corresponding to the generic smart device control command. The adapter interaction engine $114_1$ then causes the specific control commands to be transmitted via the selected one of the radios $112_{A-N}$, and addressed to the smart device(s), to thereby effectuate a state change at the addressed smart device(s), or at smart device(s) connected to the addressed smart device(s) (e.g., when the addressed smart device(s) is a hub controlling additional smart device(s)).

One or more of the client devices 110 further optionally include a respective routing engine $115_{1-N}$ and/or a respective registration engine $116_{1-N}$. Each routing engine $115_{1-N}$ can selectively determine to route, via a local network, a received generic smart device control command to an alternate client device, of the ecosystem of client devices $110_{1-N}$, based on one or more criteria. For example, the client device $110_1$ can initially identify a smart device control command based on, for example, the smart device control command being generated locally at the client device $110_1$ (e.g., responsive to touch-interaction with a corresponding graphical element displayed at the client device $110_1$) or being generated at remote automated assistant components 120, and initially being provided to the client device $110_1$ based on being generated based on spoken or other input received at the client device $110_1$.

The generic smart device control command can specify a particular smart device to be controlled, and the routing engine $115_1$ can determine that a reliable communications channel is not established between the client device $110_1$ and the particular smart device. For example, the particular smart device can be one to be controlled via a Bluetooth communications channel and the routing engine $115_1$ can determine that the particular smart device is not detectable via a Bluetooth radio of radios $112_{A-N}$ of client device $110_1$, or a signal strength between the client device $110_1$ and the particular smart device, via the Bluetooth radio, fails to satisfy a threshold. Such a determination can be based on, for example, current readings via the Bluetooth radio and/or based on local version of the home graph $152_1$ indicating that the client device $110_1$ does not have a reliable connection with the particular smart device.

In response, the routing engine $115_1$ can transmit the generic smart device control command, over a local network (e.g., Wi-Fi or a mesh network established between assistant client devices $110_{1-N}$) to an alternate client device $110_{2-N}$ that has an established reliable communications channel to the smart device. The routing engine $115_1$ can determine such an alternate client device utilizing, for example, local version of the home graph $152_1$, which can indicate that the alternate client device has a reliable connection with the smart device. For example, the routing engine $115_1$ can select the alternate client device based on the local version of the home graph $152_1$ indicating the alternate client device has the best signal strength, for the smart device, amongst all client devices $110_{1-N}$. The local version of the home graph $152_1$ is locally stored at the client device $110_1$ and can be the same or a variant of the home graph 152 maintained by the remote automated assistant component(s) 120 (e.g., a compressed version, a slightly less up to date version). The alternate client device, in response to receiving the generic smart device control command, can then use a corresponding local adapter to translate the generic smart device control command to a corresponding specific command, and transmit the corresponding specific command to the particular smart device. Alternatively, the adapter interaction engine $114_1$ can generate the corresponding specific command using a corresponding local one of the adapters $113_{A-N}$, and transmit the corresponding specific command to the alternate client device, in lieu of transmitting the generic smart device control command.

Each of the registration engines $116_{1-N}$ is utilized in locally discovering, provisioning, and/or registering smart devices for an account of a user. Each of the registration engines $116_{1-N}$ can interface with a respective locally stored home graph $152_{A-N}$, respective adapters $113_{A-N}$ (e.g., via a respective adapter interaction engine $114_{1-N}$), and respective radios $112_{A-N}$ in discovering, provisioning, and/or registering smart devices. Further, each of the registration engines $116_{1-N}$ can interface with a cloud registration engine 127 of cloud-based automated assistant component(s) 120.

In some implementations, a smart device that is not yet registered can be discovered by causing each of the registration engines $116_{1-N}$ to scan one or more respective communications channels (e.g., Wi-Fi, Bluetooth, and/or other) for smart device(s) that aren't registered. For example, for Wi-Fi, each of the registration engines $116_{1-N}$ can cause a scan to be performed via a respective Wi-Fi radio, of radios $112_{A-N}$, to identify any unregistered device(s), optionally using service set identifiers (SSIDs) and/or basic service set identifiers (BSSIDs) to filter for particular smart devices for which corresponding adapters are available. As another example, for Bluetooth, each of the registration engines $116_{1-N}$ can cause a scan to be performed via a respective Bluetooth radio to identify any un-paired smart device(s), optionally utilizing identifier(s) to filter for particular smart devices for which corresponding adapters are available. The discovery can occur at periodic or non-periodic intervals, or in response to a user request (e.g., a voice request, a request initiated via a smart phone app for the assistant, etc.).

When one or more of the registration engines $116_{1-N}$ discovers a smart device, the routing engine of one of the smart devices that discovered the smart device can provision the smart device by pairing with it (e.g., in the case of Bluetooth) and/or causing it to be connected to a secured Wi-Fi network to which the client devices $110_{1-N}$ are already connected. Which of the registration engines $116_{1-N}$ provisions the smart device can be determined based on negotiation directly between the client devices $110_{1-N}$ and/or can be determined by cloud routing engine 125, which can receive indications, from registration engines$_{1-N}$, of which registration engines$_{1-N}$ discovered the smart device.

After provisioning, data provided by the provisioned smart device can be received, at one of the client devices $110_{1-N}$, and processed using a corresponding local adapter $113_{A-N}$ of the assistant client device, to generate registration data in a schema of the automated assistant. The corresponding local adapter can already be locally provided at the client device or can optionally be pushed, to the client device, by cloud-based automated assistant component(s) 120 responsive to the provisioning of the smart device. For example, the cloud registration engine 127 can access 3P adapters database 150 to retrieve a 3P adapter that corresponds to the smart device that is provisioned, and push the 3P adapter to one or more (e.g., all) of the client devices $110_{1-N}$ for local storage and utilization at the client devices $110_{1-N}$ The registration data generated by the local adapter $113_{A-N}$ can be utilized by the automated assistant to add the smart device to a home graph or other structure that defines smart devices, assistant client devices, and various properties (e.g., name(s), location(s), etc.) of the smart devices and assistant client devices. For example, the registration data can be transmitted to the cloud registration engine 127, which can add the registration data to the home graph 152, and optionally push updated local versions of the home graph $152_{1-N}$ to each of the client devices $110_{1-N}$. The cloud registration engine 127 can optionally also interface with a corresponding one of the smart device systems $140_{A-N}$, to report the registration to the smart device system to thereby enable the smart device system to locally correlate the smart device registration.

In some implementations, the cloud registration engine 127 registers a smart device with the home graph 152, based on biometric data, detected via one or more of the client devices $110_{1-N}$, corresponding to an account associated with the home graph 152. For example, the smart device can be assigned to the home graph 152 (e.g., in lieu of another home graph associated with another account of one or more of the client devices $110_{1-N}$) based on voice data, received via one or more of the client devices $110_{1-N}$ during the discovering, provisioning, and/or registering, matching voice authentication data stored in association with the account. Other biometric identification can additionally or alternatively be utilized, such as facial, fingerprint, etc. In some implementations, the cloud registration engine 127 can associate a registered smart device (e.g., in home graph 152 and local versions) with those client device(s) $110_{1-N}$ that can locally transmit commands to the smart device. For example, if communications with the smart device occur via a short-range radio (e.g., Bluetooth radio), those client devices $110_{1-N}$ having at least a corresponding signal strength (for the corresponding connection to the smart device via the short-range radio), can be designated in the home graph 152, optionally along with a designation of the corresponding signal strengths. Such designations can be used by routing engines $115_{1-N}$ and/or by cloud routing engine 125 in determining which assistant client device(s) should be utilized in generating and/or transmitting specific control commands to the smart device.

In some implementations, a smart device is discovered that is broadcasting an access point and that smart device is not yet provisioned as it is not connected to a secured Wi-Fi network utilized by the client devices $110_{1-N}$, and lacks the credentials for connecting to the secured Wi-Fi network. In some of those implementations, each of a plurality of the client devices $110_{1-N}$, detected the availability of the access point through scanning of its respective Wi-Fi radio. In some versions of those implementations, a single assistant client device is selected for connecting to the smart device via the access point of the smart device, and securely sharing, with the smart device via the connection, the credentials for connecting to the secured Wi-Fi network. The single client device can be selected through negotiation of the registration engines $116_{1-N}$ of the client devices, or by the cloud registration engine 127. Once the credentials are shared, the smart device connects to the secured Wi-Fi network and can be registered through communications via the Wi-Fi network. In various versions where the single assistant client device is selected, it is selected based at least in part on human interaction data for the single assistant client device. For example, it can be selected based on the human interaction data indicating that no user interface input has been received at the single assistant client device within a threshold amount of time and/or based on the human interaction data indicating that the single assistant client device is utilized less frequently than any other of the plurality of assistant client devices that detected the access point. In these and other manners, the single client device can be selected so that disruption to ongoing and/or forthcoming assistant interactions is prevented, as the single client device will break its connection with the secured Wi-Fi network when connecting to the local access point—and the single client device is selected based on criteria that indicated it is not being used and/or is less likely (than other devices of the ecosystem) to be used.

In some implementations, a smart device that is not yet registered can be discovered by causing each of the registration engines $116_{1-N}$ to scan one or more respective communications channels (e.g., Wi-Fi, Bluetooth, and/or other) for smart device(s) that aren't registered. However, in some of those implementations the smart device may not be registrable locally and/or controllable locally. Nonetheless, in some versions of those implementations a notification related to the discovered smart device can be presented at one or more of the assistant client device(s) and/or other client device(s). The notification can include link(s) and/or other interactive content that can be interacted with to facilitate registration in a non-local manner (e.g., via the cloud). For example, the interactive content, when selected, can result in rendering of a single sign in interface and/or a smart device specific sign in interface that enables registering of the smart device.

As mentioned above, cloud-based automated assistant component(s) 120 can optionally interface with each of the client devices 110 in performance of certain operations. The cloud-based automated assistant components 120 can include a STT module 121 configured to leverage the resources of the cloud to convert audio data (provided by a corresponding client device 110) into text (which may then be provided to NLU module 122). TTS module 123 may be configured to leverage the resources of the cloud to convert textual data into computer-generated speech output. NLU module 122 processes natural language input generated by users via client devices $110_{1-N}$ and may generate annotated output for use by one or more other components of cloud-based automated assistant component(s) 120. For example, the NLU module 122 may process natural language freeform input that is generated by a user via one or more user interface input devices of client device $110_1$, such as text that has been converted from spoken input, or typed text. The generated annotated output includes one or more annotations of the natural language input and optionally one or more (e.g., all) of the terms of the natural language input.

In some implementations, the NLU module 122 is configured to identify and annotate various types of grammatical information in natural language input. For example, the NLU module 122 may include a part of speech tagger and/or an entity tagger. In some implementations, the NLU module 122 may additionally and/or alternatively include a coreference resolver (not depicted) configured to group, or "cluster," references to the same entity based on one or more contextual cues. In some implementations, one or more components of the NLU module 122 may rely on annotations from one or more other components of the NLU module 122.

Cloud routing engine 125 can optionally be utilized to select a particular client device, of client devices $110_{1-N}$, to which to provide a given generic smart device control command. The cloud routing engine 125 can utilize the home graph 152 in selecting the particular client device. For example, the cloud routing engine 125 can utilize the home graph 152 to select the particular client device based on the home graph 152 indicating that the particular client device has an established communication channel with smart device(s) of the generic smart device control command and/or has the best (e.g., highest signal strength) communications channel with smart device(s) of the generic smart device control command. The cloud routing engine 125 can then address the generic smart device control command to the selected particular client device (e.g., using an address stored in the home graph) to cause it to be transmitted directly to that client device, for locally converting, at the selected particular client device, to specific control commands and for locally transmitting, at the selected particular client device, the specific control commands to corresponding smart device(s). The cloud routing engine 125 can route a generic smart device control command to a particular client device, even when the generic smart device control command is generated responsive to user interface input received at a difference client device.

As described herein, in some implementations cloud-based automated assistant component(s) 120 (e.g., STT module 121 and NLU module 122) can process audio data corresponding to spoken input captured at one of the client devices 110, generate a generic smart device control command based on such spoken input, and return the generic command to the one of the client devices 110 for local generation, at the one of the client devices, of specific commands for the corresponding smart device(s). In other implementations or situations, the cloud-based automated assistant component(s) can provide generic smart device control command(s) responsive to other signals, such as responsive to triggering of an automated assistant routine that involves the generic smart device control command.

Figure 2:
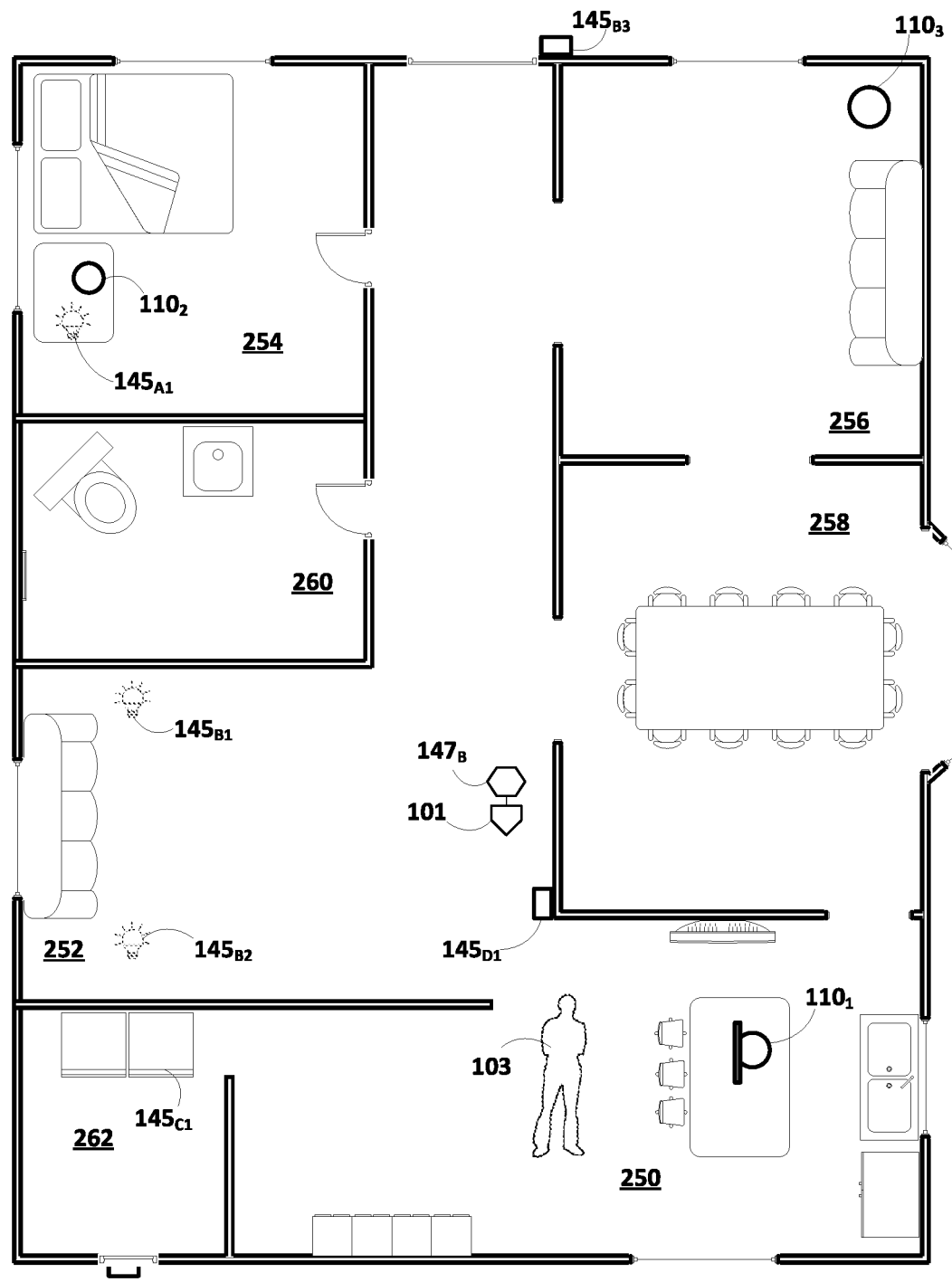
FIG. 2 illustrates an example environment that includes multiple smart devices, from a plurality of disparate parties, and that includes multiple assistant devices, each of which can locally control one or more of the smart devices according to implementations disclosed herein.

Additional description of various components of FIG. 1 is now provided with reference to the additional figures. FIG. 2 depicts a home floorplan that includes a plurality of rooms, 250, 252, 254, 256, 258, 260, and 262. A plurality of client devices $110_{1-3}$ are deployed throughout at least some of the rooms. Each of the client devices $110_{1-3}$ can optionally implement an instance of an automated assistant client configured with selected aspects of the present disclosure and can optionally include one or more input devices, such as microphones, touch-screens, etc. and/or one or more output devices such as speakers, displays, etc. For example, a first client device $110_1$ taking the form of a standalone interactive speaker and display device (e.g., display screen, projector, etc.) is deployed in room 250, which in this example is a kitchen. A second client device $110_2$ taking the form of an interactive standalone speaker is deployed in room 254, which in this example is a bedroom. A third client device $110_3$, also taking the form of an interactive standalone speaker, is deployed in room 256.

The plurality of client devices $110_{1-3}$ may be communicatively coupled with each other and/or other resources (e.g., smart devices and the Internet) via a wireless router 101, depicted in room 252, and/or a local mesh network. Additionally, other client devices—particularly mobile devices such as smart phones, tablets, laptops, wearable devices, etc.—may also be present, e.g., carried by one or more persons (e.g., user 103) in the home and may or may not also be connected to the same LAN. It should be understood that the configuration of client devices depicted in FIG. 2 is just one example; more or fewer and/or different client devices may be deployed across any number of other rooms and/or areas other than a home.

Further depicted in FIG. 2 are a plurality of smart devices. The smart devices include a smart light $145_{A1}$ that is provided by a first 3P (as indicated by the "A" designation). The smart light $145_{A1}$ is controllable via a Bluetooth radio using a protocol suite, of the first 3P, that is a variation of an industry standard. The smart devices further include smart lights $145_{B1}$ and $145_{B2}$, and a smart doorbell $145_{B3}$, that are controlled via a hub $147_B$ that is coupled to the wireless router 101. The smart lights $145_{B1}$ and $145_{B2}$, smart doorbell $145_{B3}$, and hub $147_B$ are provided by a second 3P (as indicated by the "B" designation). The smart lights $145_{B1}$ and $145_{B2}$, smart doorbell $145_{B3}$, and hub $147_B$ utilize an industry standard protocol, and the hub $147_B$ is addressable via TCP/IP, utilizing a Wi-Fi radio and via its hardwired connection to wireless router 101. The smart devices further include smart washer $145_{C1}$ that is provided by a third 3P (as indicated by the "C" designation). The smart washer $145_{C1}$ is controllable via a low-rate wireless personal area network radio channel using a proprietary protocol suite of the third 3P. The smart devices further include smart thermostat $145_{D1}$ that is provided by a fourth 3P (as indicated by the "D" designation). The smart thermostat $145_{D1}$ is controllable via a Wi-Fi radio using a variation, of the fourth 3P, of the UDP protocol suite. It should be understood that the configuration of smart devices 145 depicted in FIG. is just one example; more or fewer and/or different smart devices may be deployed across any number of other rooms and/or areas other than a home.

Figure 3:
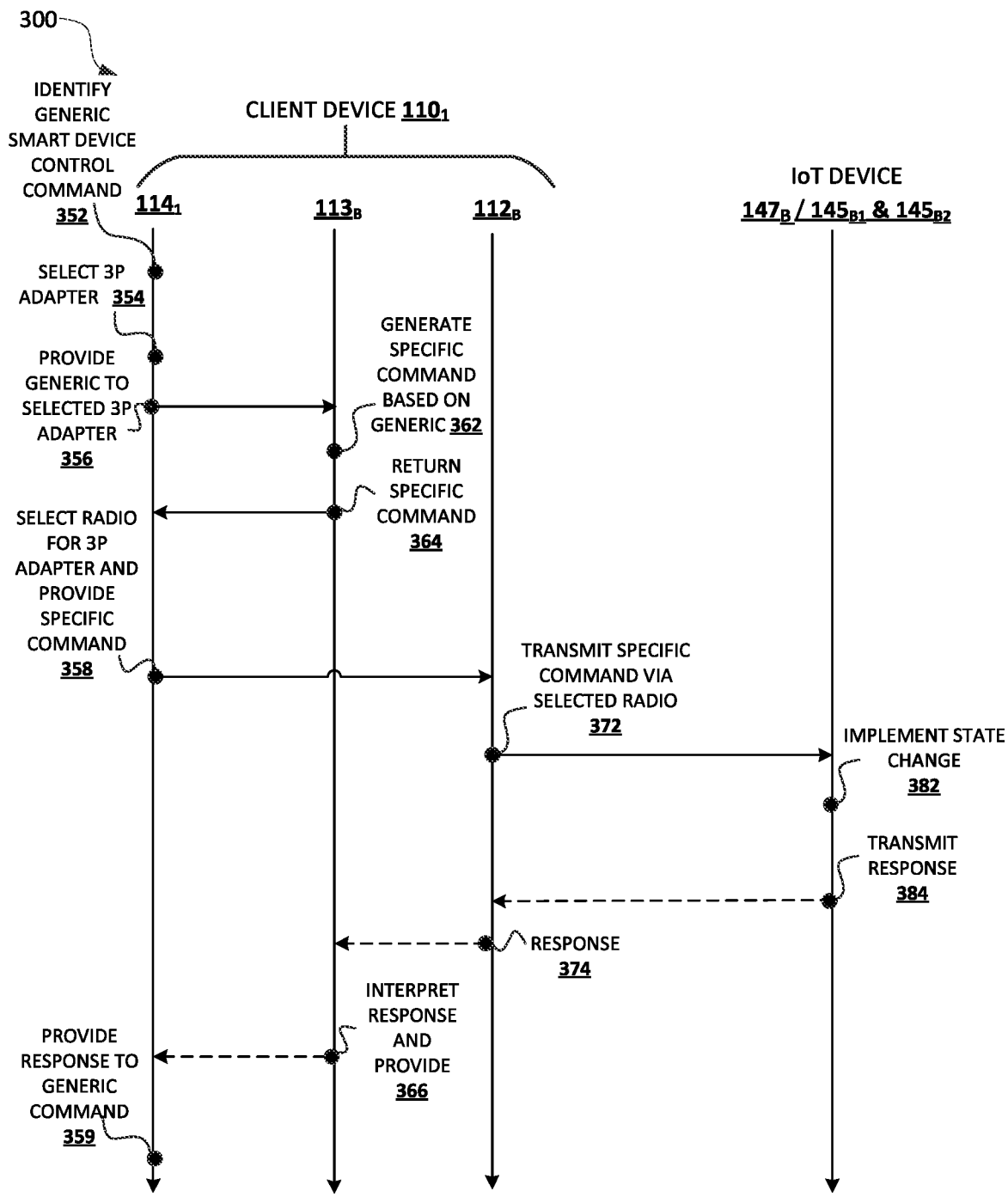
FIG. 3 illustrates a state diagram of an example of controlling two smart light bulbs of FIG. 2, using one of the client devices of FIG. 2.

FIG. 2 and the above description of FIG. 2 will now be utilized in describing various aspects of FIGS. 3-7. FIG. 3 illustrates an example state diagram 300 of an example of controlling smart lights $145_{B1}$ and $145_{B2}$ of FIG. 2, using client device $110_1$ of FIG. 2. In FIG. 3, adapter interaction engine $114_1$ of client device $110_1$ identifies a generic smart device control command at 352. The generic smart device control command can be generated by client device $110_1$, or provided to client device $110_1$ by remote cloud-based automated assistant component(s) 120 and/or by another client device. The generic smart device control command identifies smart lights $145_{B1}$ and $145_{B2}$, indicates that their color should be adjusted to "bright red", and optionally identifies the second 3P.

At 354, the adapter interaction engine $114_1$ selects 3P adapter $113_B$ that corresponds to the second 3P. The adapter interaction engine $114_1$ can select the 3P adapter $113_B$, from a plurality of available 3P adapters stored locally at the client device $110_1$, based on the 3P adapter $113_B$ being assigned to the second 3P and/or to the smart lights $145_{B1}$ and $145_{B2}$ specified in the generic smart device control command.

At 356, the interaction engine $114_1$ provides the generic smart device control command to the 3P adapter $113_B$. In some implementations, the 3P adapter $113_B$ is locally stored, and optionally already executing, at the client device $110_1$ based on the smart lights $145_{B1}$ and $145_{B2}$ and/or other smart device(s) of the second 3P being registered for an account associated with the client device $110_1$. In some implementations, the 3P adapter $113_B$ is already executing at the client device $110_1$ further based on, for example, the 3P adapter $113_B$ being recently utilized at the client device $110_1$, being utilized in the past at dates/times that are similar to a current date/time, and/or based on one or more other criteria.

At 362, the 3P adapter $113_B$ generates a specific command based on the provided generic command and, at 364, the 3P adapter $113_B$ returns the generated specific command to the adapter interaction engine $114_1$. It is noted that, even though the second 3P utilizes a standard protocol, the generated specific command may differ from that which would otherwise be generated utilizing the standard protocol since, for example, the 3P adapter $113_B$ may integrate custom logic, of the second 3P, that will result in specific commands, for the "bright red" state change request, that are specifically tailored to the second 3P. The specific command can be addressed to the smart hub $147_B$ that can directly forward the specific command to the smart lights $145_{B1}$ and $145_{B2}$, which can directly interpret the specific command to cause a change of the color state of the lights to the "bright red" state. Alternatively, the smart hub $147_B$ can interpret the specific command to thereby directly control the smart lights $145_{B1}$ and $145_{B2}$ in accordance with the specific command.

At 358, the adapter interaction engine $114_1$ selects a radio $112_B$ for the 3P adapter $113_B$ and provides the specific command to cause it to be transmitted using the selected radio at 372. The radio $112_B$ is selected, from a plurality of available radios at the client device $110_1$, based on being assigned (locally at the client device $110_1$) to the 3P adapter $113_B$. For example, the radio $112_B$ can be a Wi-Fi radio and the specific command can be transmitted to the smart hub $147_B$ via TCP/IP.

As noted above, the smart hub $147_B$ can directly forward the specific command to the smart lights $145_{B1}$ and $145_{B2}$, which can directly interpret the specific command to cause a change of the color state of the lights to the "bright red" state. Alternatively, the smart hub $147_B$ can interpret the specific command and send further interpreted commands to thereby directly control the smart lights $145_{B1}$ and $145_{B2}$ in accordance with the specific command. Regardless, at 382 the state change is implemented. Optionally, at 384 the smart hub $147_B$ transmits a response back to the radio $112_B$ and at 374 the response is provided to the 3P adapter $113_B$, which at 366 interprets the response (e.g., into a schema of the automated assistant) and provides the interpreted response to the adapter interaction engine $114_1$. The adapter interaction engine $114_1$ can optionally, at 359, provide the interpreted response to one or more additional components, as a response to the identified generic command. For example, where the interpreted response indicates the state change was successful it can be provided to update a display of client device $110_1$ to indicate the success, can be provide to cloud-based automated assistant component(s) 120 to update the home graph 152 to reflect the state change, provided to a system 140 associated with the second 3P to reflect the state change, and/or provided to other component(s).

Figure 4:
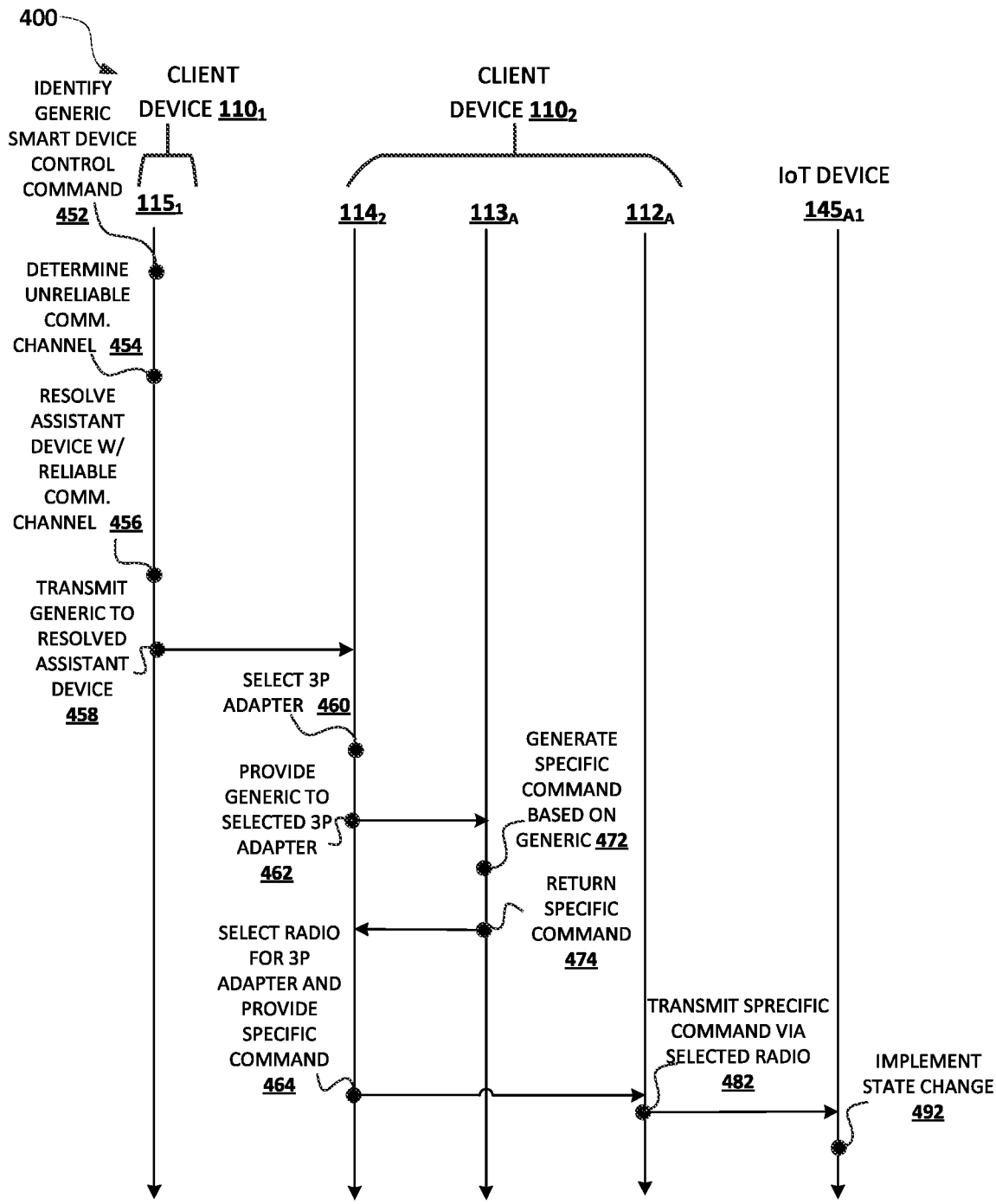
FIG. 4 illustrates a state diagram of an example of routing a generic smart device control command, for controlling another light bulb of FIG. 2, from a first client device of FIG. 2 to an alternate client device of FIG. 2.

FIG. 4 illustrates an example state diagram 400 of an example of routing a generic smart device control command, for controlling smart light $145_{A1}$ of FIG. 2, from client device $110_1$ of FIG. 2 to client device $110_2$ of FIG. 2. In FIG. 4, routing engine $115_1$ of client device $110_1$ identifies a generic smart device control command at 452. The generic smart device control command can be generated by client device $110_1$, or provided to client device $110_1$ by remote cloud-based automated assistant component(s) 120 and/or by another client device. For example, the generic smart device control command can be generated by client device $110_1$ responsive to touch-interaction with a graphical interface element, displayed via a touch-screen of the client device $110_1$, that enables adjusting a dimming level of the smart light $145_{A1}$. The generic smart device control command identifies smart light $145_{A1}$, indicates that it should be adjusted to a "50% dimmed" state, and optionally identifies the first 3P.

At 454, the routing engine $115_1$ determines that client device $110_1$ has an unreliable communication channel with the smart light $145_{A1}$. For example, as mentioned above the smart light $145_{A1}$ can be controllable via a Bluetooth radio. Due to the distance between the client device $110_1$ and the smart light $145_{A1}$, and/or due to obstructions, the Bluetooth radio of the client device $110_1$ may not have any communication with the smart light $145_{A1}$ or may have communication, but with a signal strength that fails to satisfy a threshold. The routing engine $115_1$ can determine the unreliable communication channel based on current data from the Bluetooth radio, or based on past historical data (e.g., stored in a local mapping of client devices to smart devices).

At 456, the routing engine $115_1$ resolves assistant client device $110_2$ that has a reliable communication channel with the smart light $145_{A1}$. In resolving the client device $110_2$, the routing engine $115_1$ can optionally rely on a client devices to smart devices mapping, stored locally at the client device $110_1$, to determine client device $110_2$ is one having an established reliable communications channel to the smart light $145_{A1}$ (e.g., as a result of being proximate to the smart light $145_{A1}$). The client devices to smart devices mapping can define client devices of the ecosystem and, for each of the assistant client devices, can define corresponding smart device(s) for which the assistant client device has a corresponding reliable communications channel, and can optionally define signal strength(s) between the assistant client device and smart device(s). Such mapping can optionally be included in a locally stored home graph as described herein.

At 458, the routing engine $115_1$ transmits, using a local network, the generic smart device control command to the resolved client device $110_2$.

At 460, the adapter interaction engine $114_2$ of the client device $110_2$ selects 3P adapter $113_A$ that corresponds to the first 3P. The adapter interaction engine $114_2$ can select the 3P adapter $113_A$, from a plurality of available 3P adapters stored locally at the client device $110_2$, based on the 3P adapter $113_A$ corresponding to the first 3P and/or the smart light $145_{A1}$ specified in the generic smart device control command.

At 462, the interaction engine $114_2$ provides the generic smart device control command to the 3P adapter $113_A$. In some implementations, the 3P adapter $113_A$ is locally stored, and optionally already executing, at the client device $110_2$ based on the smart light $145_{A1}$ being registered for an account associated with the client device $110_2$. In some implementations, the 3P adapter $113_A$ is already executing at the client device $110_1$ further based on, for example, there being a strong strength of signal between the client device $110_2$ and the smart light $145_{A1}$, 3P adapter $113_A$ being recently utilized at the client device $110_1$, and/or based on one or more other criteria.

At 472, the 3P adapter $113_A$ generates a specific command based on the provided generic command and, at 474, the 3P adapter $113_A$ returns the generated specific command to the adapter interaction engine $114_2$. It is noted that the first 3P utilizes a protocol suite that is a variation of an industry standard and, as a result, the generated specific command may not conform to the industry standard. The specific command can be addressed to the smart light $145_{A1}$, which can directly interpret the specific command to cause a change of the dimming level of the smart light $145_{A1}$ to "50%".

At 464, the adapter interaction engine $114_2$ selects a radio $112_A$ for the 3P adapter $113_A$ and causes it to be transmitted using the selected radio at 482. The radio $112_A$ is selected, from a plurality of available radios at the client device $110_2$, based on being assigned (locally at the client device $110_2$) to the 3P adapter $113_A$. For example, the radio $112_A$ can be a Bluetooth radio.

At 492 the smart light $145_{A1}$ directly interprets the specific command to cause a change of the dimming level of the smart light $145_{A1}$ to "50%". Optionally the smart light $145_{A1}$ transmits a response back to the radio $112_A$ and the response is provided to the 3P adapter $113_A$, which interprets the response (e.g., into a schema of the automated assistant) and provides the interpreted response to the adapter interaction engine $114_2$. The adapter interaction engine $114_2$ can optionally provide the interpreted response to one or more additional components, as a response to the identified generic command.

Figure 5:
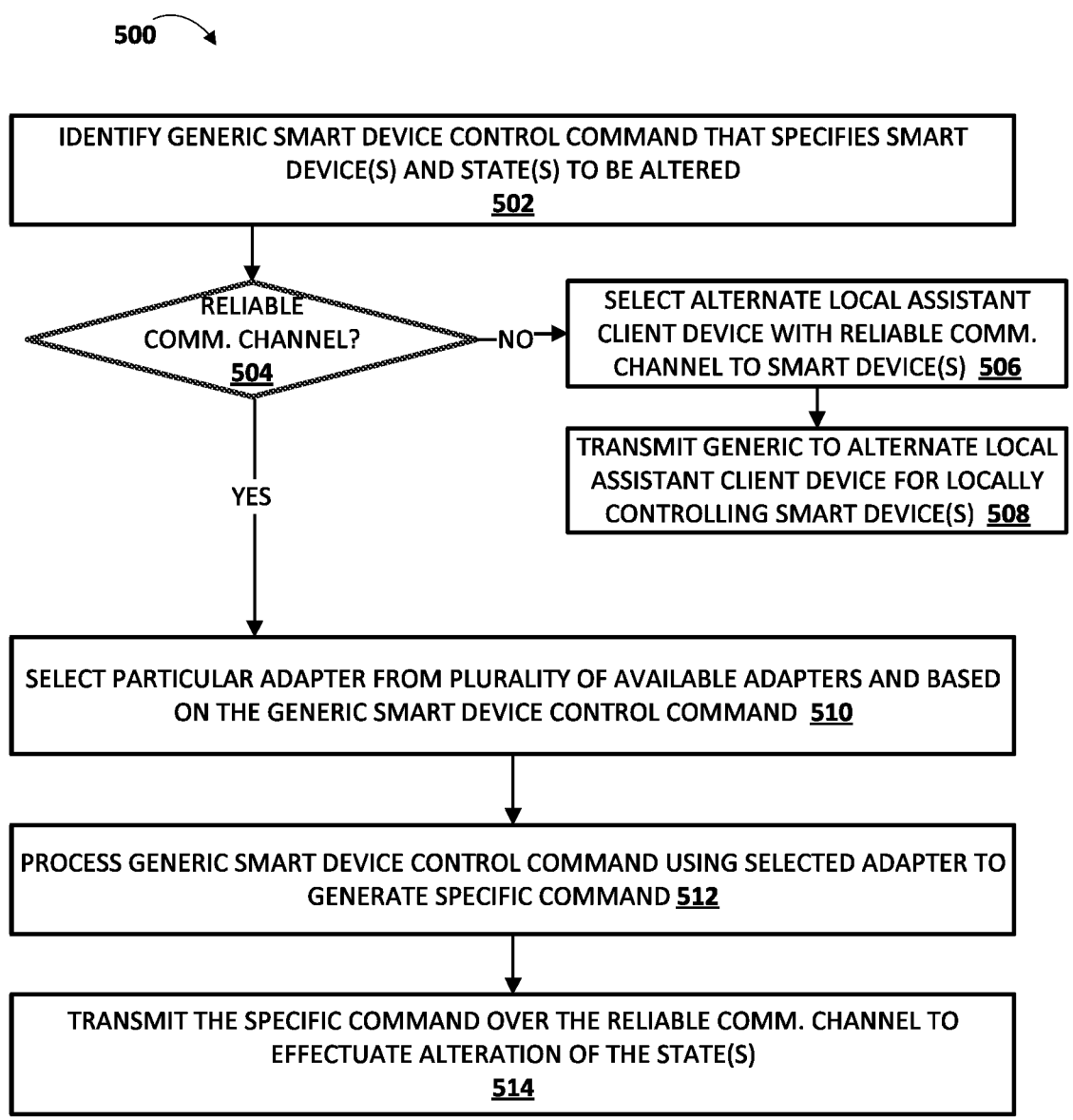
FIG. 5 is a flow chart illustrating an example method of controlling a smart device, using a local assistant client device, according to various implementations disclosed herein.
Figure 6:
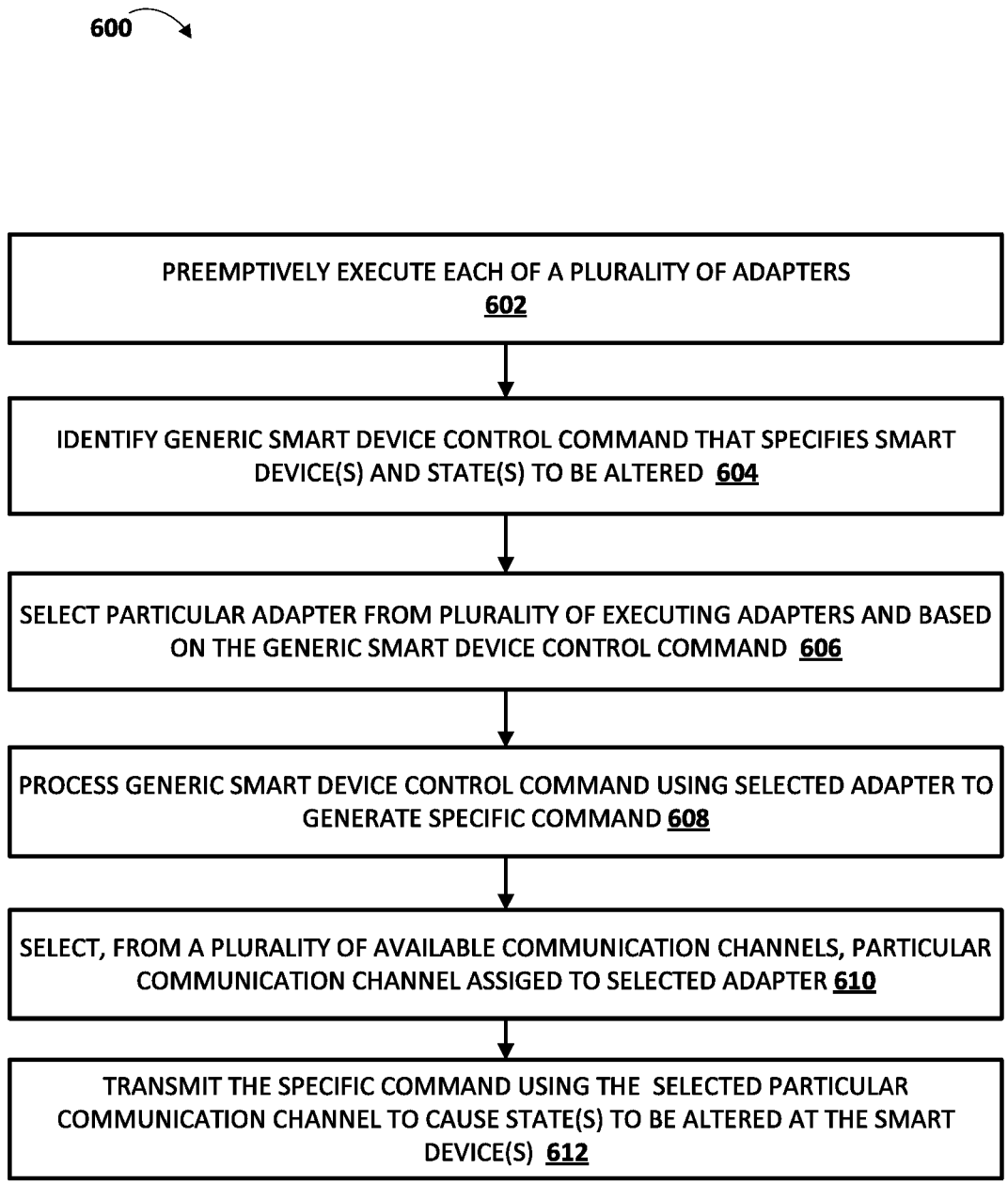
FIG. 6 is a flow chart illustrating another example method of controlling a smart device, using a local assistant client device, according to various implementations disclosed herein.
Figure 7:
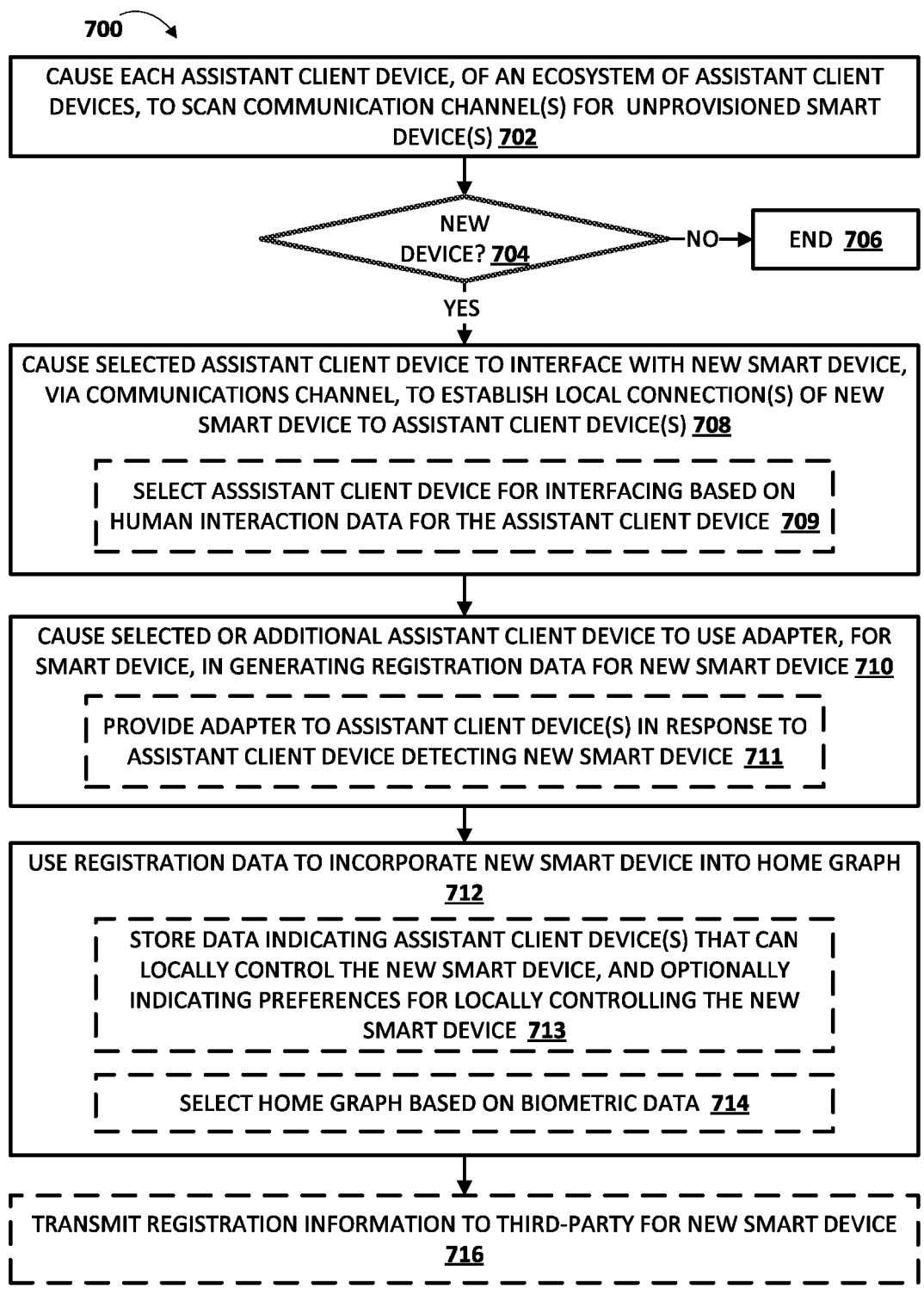
FIG. 7 is a flow chart illustrating an example method of registering a smart device, using a local assistant client device, according to various implementations disclosed herein.

Turning now to FIGS. 5-7, various methods are described with reference to operations of flow charts of those figures. For convenience, the operations of flow charts described below are described with reference to a system that performs the operations. The system can include one or more components of one or more client devices (e.g., client devices that execute an automated assistant client) and/or one or more components of a separate computing system (e.g., remote automated assistant server(s)). Moreover, different systems can perform the operations of different flowcharts. Additionally, while the operations of the flowcharts are shown in a particular order, this is not meant to be limiting. One or more operations may be reordered, omitted, or added.

FIG. 5 is a flow chart illustrating an example method of 500 controlling a smart device, using a local assistant client device, according to various implementations disclosed herein. FIG. 5 can be implemented using one or more processors of the local assistant client device.

At block 502, the system identifies a generic smart device control command that specifies smart device(s) and state(s) of the smart device(s) to be altered.

At block 504, the system determines whether there is a reliable communications channel.

If, at block 504, the system determines there is not a reliable communications channel, the system proceeds to block 506.

At block 506, the system selects an alternate local assistant client device with a reliable communications channel to the smart device(s).

At block 508, the system transmits the generic smart device control command to the selected alternate local assistant client device for locally controlling the smart device(s). The selected alternate local assistant client device, upon receiving the generic smart device control command, can locally process the generic smart device control command to generate a specific command, that corresponds to the generic smart device control command, and that is directly interpretable by the smart device to effectuate alteration of the state at the smart device. The selected alternate local assistant client device can further transmit the specific command over the established reliable communications channel to effectuate the alteration of the state at the smart device.

If, at an iteration of block 504, the system determines there is a reliable communications channel, the system proceeds to block 510.

At block 510, the system selects a particular adapter from a plurality of available adapters and based on the generic smart device control command.

At block 512, the system processes the generic smart device control command using the selected adapter to generate specific commands.

At block 514, the system transmits the specific command over the reliable communications channel to effectuate an alteration of the state(s) of the smart device(s).

FIG. 6 is a flow chart illustrating another example 600 method of controlling a smart device, using a local assistant client device, according to various implementations disclosed herein. FIG. 6 can be implemented using one or more processors of the local assistant client device.

At block 602, the system preemptively executes each of a plurality of adapters, such as a plurality of 3P adapters and optionally a 1P adapter.

At block 604, the system identifies a generic smart device control command that specifies smart device(s) and state(s) of the smart device(s) to be altered.

At block 606, the system selects, based on the generic smart device control command, a particular adapter from the plurality of executing adapters.

At block 608, the system processes the generic smart device control command using the selected adapter to generate a specific command.

At block 610, the system selects, from a plurality of available communication channels, a particular communication channel assigned to the selected adapter.

At block 612, the system transmits the specific command using the selected particular communication channel to cause the state(s) to be altered at the smart device(s).

FIG. 7 is a flow chart illustrating an example method 700 of registering a smart device, using a local assistant client device, according to various implementations disclosed herein. FIG. 7 can be implemented using one or more processors of the local assistant client device and/or one or more processors of remote automated assistant server(s).

At block 702, the system causes each assistant client device, of an ecosystem of assistant client devices, to scan communication channel(s) for an unprovisioned smart device(s).

At block 704, the system determines whether any new unprovisioned smart devices are detected by the scanning.

If, at an iteration of block 704, the system determines there aren't any new unprovisioned smart devices, the system proceeds to block 706 and the method 700 ends.

If at an iteration of block 704, the system determines there is at least one new unprovisioned smart device, the system proceeds to block 708.

At block 708, the system causes a selected assistant device to interface with the new smart device, via a communications channel, to establish local connection(s) of the new smart device to the assistant client device(s). Block 708 may optionally include one or more sub-blocks, such as sub-block 709.

At sub-block 709, the system can select the assistant client device for interfacing based on human interaction data for the assistant client device. For example, at sub-block 709 the new smart device can be the smart thermostat $145_{D1}$ of FIG. 2 and it can be broadcasting an access point, but not yet connected to the secured wireless router 101 utilized by the assistant client devices, and can lack the credentials for connecting to the secured wireless router 101. In some of those implementations, each of a plurality of assistant client devices, of the ecosystem of client devices, detected the availability of the access point through scanning of its respective Wi-Fi radio. For example, all three of the client devices $110_{1-3}$ of FIG. 2 may have detected the availability of the access point. In some versions of those implementations, a single assistant client device is selected for connecting to the smart device via the access point of the smart device, and securely sharing, with the smart device via the connection, the credentials for connecting to the secured Wi-Fi network. Once the credentials are shared, the smart device connects to the secured Wi-Fi network and can be registered through communications via the Wi-Fi network. The single assistant client device can be selected based at least in part on human interaction data for the single assistant client device. For example, client device $110_3$ can be selected based on the human interaction data indicating that no user interface input has been received at client device $110_3$ within a threshold amount of time and/or based on the human interaction data indicating that the client device $110_3$ is utilized less frequently than client device $110_1$ and client device $110_2$.

At block 710, the system causes the selected or an additional assistant client device to use an adapter, for the new smart device(s), in generating registration data for the new smart device. Block 710 may optionally include one or more sub-blocks. At sub-block 711, the system can provide the adapter to the assistant client device(s) in response to the assistant client device(s) detecting the new smart device. For example, the adapter may not yet be locally stored at the assistant client device(s) if other smart device(s), for the party associated with the new smart device(s), are not yet linked with the assistant client devices. In such a situation, the adapter for that party can be retrieved from an adapter database, and provided to the assistant client device(s).

At block 712, the system uses the registration data to incorporate the new smart device into a home graph. Block 712 may optionally include one or more sub-blocks. At sub-block 713, the system may store data indicating the assistant client device(s) that can locally control the new smart device, and optionally indicating preferences for locally controlling the new smart device. At sub-block 714, the system may optionally select the home graph based on biometric data, detected via one or more of the assistant client devices, corresponding to an account associated with the home graph.

At block 715, the system may optionally transmit registration information to a third-party for the new smart device.

Figure 8:
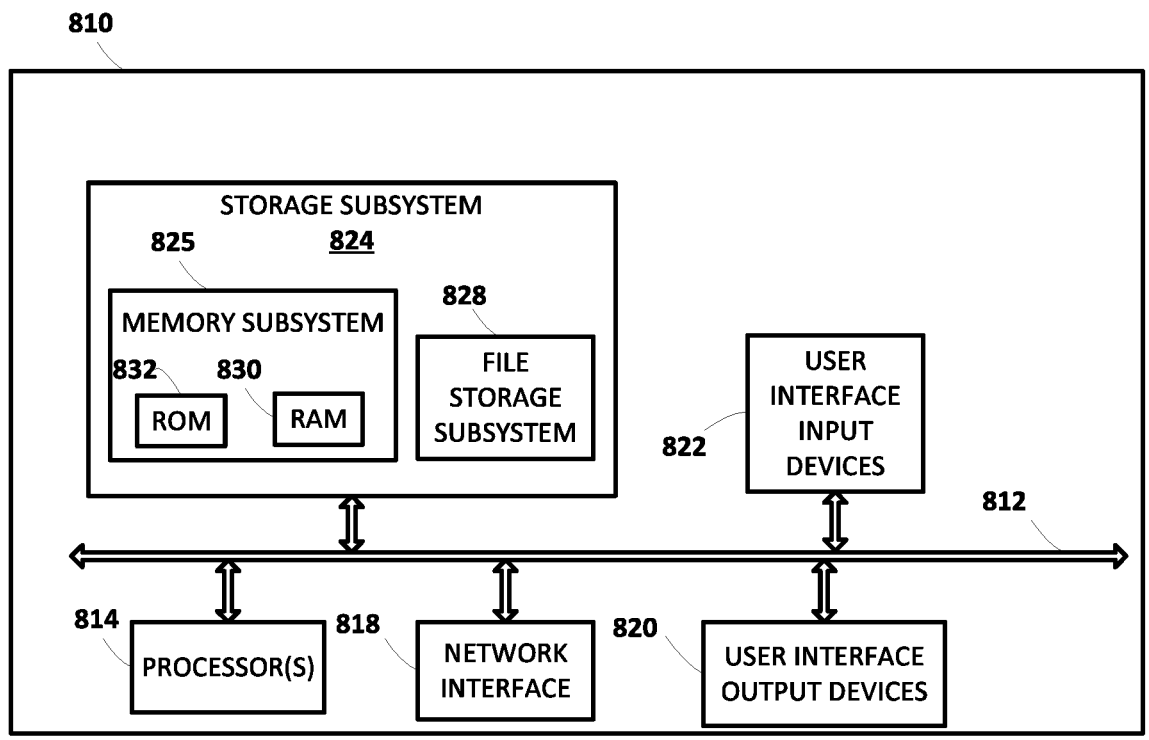
FIG. 8 illustrates an example architecture of a computing device.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 828, user interface output devices 820, user interface input devices 822, and a network interface subsystem 818. The input and output devices allow user interaction with computing device 810. Network interface subsystem 818 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of one or more methods described herein.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 828 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 828 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

In some implementations, a method implemented by one or more processors of a client device executing an automated assistant client is provided, and includes identifying a generic smart device control command. The generic smart device control command specifies at least one smart device and at least one state to be altered at the smart device. The method further includes determining whether a reliable communications channel is established between the client device and the smart device and, responsive to determining the reliable communications channel is not established between the client device and the smart device: accessing a client devices to smart devices mapping, stored locally at the client device, to resolve an additional client device with an established reliable communications channel to the smart device; and transmitting, over a local network, the generic smart device control command to the additional client device. Transmitting the generic smart device control command to the additional client device causes the additional client device to: locally process the generic smart device control command to generate a specific command, that corresponds to the generic smart device control command, and that is directly interpretable by the smart device to effectuate alteration of the state at the smart device, and transmit the specific command over the established reliable communications channel to effectuate the alteration of the state at the smart device.

These and other implementations of the technology can optionally include one or more of the following features.

In some implementations, the method further includes, responsive to determining the reliable communications channel is established between the client device and the smart device: selecting a particular third-party (3P) adapter from a plurality of 3P adapters locally executable at the client device, the selecting based on the smart device control command; processing the smart device control command using the selected 3P adapter to generate the specific command, that corresponds to the generic smart device control command, and that is directly interpretable by the smart device to effectuate alteration of the state at the smart device; and transmitting, over the reliable communications channel established between the client device and the smart device, the specific command to effectuate the alteration of the state at the smart device. In some versions of those implementations, the method further includes, prior to the identifying the generic smart device control command: receiving the particular 3P adapter at the client device and from a remote server, where receiving the particular 3P adapter is responsive to the smart device, or an additional smart device of the 3P, being registered for the client device. In some additional or alternative versions of those implementations, the method further includes, prior to the identifying the generic smart device control command: preemptively executing, locally at the client device, the particular 3P adapter to reduce latency in processing the smart device control command using the selected 3P adapter to generate the specific command.

In some implementations, determining whether the reliable communications channel is established between the client device and the smart device includes determining whether any communications channel is established between the client device and the smart device and/or determining whether a communications channel, established between the client device and the smart device, has at least a threshold signal strength. Determining whether any communications channel is established and determining whether the communications channel has at least a threshold signal strength can be based on the client devices to smart devices mapping and/or can be based on one or more signals received via the communications channel subsequent to a most recent updating of the client devices to smart devices mapping.

In some implementations, accessing the client devices to smart devices mapping, stored locally at the client device, to resolve the additional client device with the established reliable communications channel to the smart device includes: determining, based on the client devices to smart devices mapping, that a given signal strength, between the additional client device and the smart device, is greatest amongst all client devices of the client devices to smart devices mapping.

In some implementations, the established reliable communications channel to the smart device is a Bluetooth radio channel.

In some implementations, the generic smart device control command is generated locally at the client device by locally processing user interface input received at the client device. In some of those implementations, the user interface input is interaction, at a touch-screen of the client device, with a rendered graphical user interface element corresponding to the smart device.

In some implementations, the user interface input is a voice input received via at least one microphone of the client device, and locally processing the user interface input includes using a speech-to-text processor to convert the voice input into text, and performing natural language understanding on the text to generate the generic smart device control command.

In some implementations, the method further includes receiving voice input via at least one microphone of the client device and streaming the voice input to a remote automated assistant system. In some versions of those implementations, identifying the generic smart device control command includes receiving the generic smart device control command from the remote automated assistant client responsive to streaming the voice input to the remote automated assistant system.

In some implementations, a method implemented by one or more processors of a client device executing an automated assistant client is provided and includes preemptively executing, locally at the client device, each of a plurality of third-party (3P) adapters each generated by a corresponding 3P. Each of the 3P adapters converts each of a plurality of corresponding generic smart device control commands into corresponding specific commands that are each tailored, when locally transmitted to at least one corresponding smart device of the 3P, to be directly interpretable by the corresponding smart device to effectuate a state change at the corresponding smart device, or at a corresponding additional smart device directly controlled by the corresponding smart device. The plurality of 3P adapters are optionally preemptively executed locally at the client device responsive to smart devices of the 3P being previously registered for the client device. The method further includes identifying a particular generic smart device control command that specifies at least one particular smart device and at least one state to be altered at the particular smart device. The method further includes: selecting, from the plurality of 3P adapters and based on the particular smart device control command, a particular 3P adapter; processing the particular smart device control command using the selected particular 3P adapter to generate a particular specific command, of the specific commands, that corresponds to the smart device control command; selecting, from a plurality of communication channels available at the automated assistant client device, a particular communication channel assigned to the particular 3P adapter; and transmitting, using the selected particular communication channel, the particular specific command to cause the at least one state to be altered at the particular smart device.

These and other implementations of the technology can optionally include one or more of the following features.

In some implementations, the plurality of 3P adapters preemptively executing at the client device are a subset of available 3P adapters stored at the client device. In some of those implementations, the method further includes selecting the particular 3P adapter, from the available 3P adapters, for preemptively executing at the client device. The selecting can be based on one or more dynamic criteria, such as a corresponding recency of utilization of the particular 3P adapter at the client device; a signal strength for a communication channel between the client device and the particular smart device corresponding to the particular 3P adapter; a time of day; and/or a day of the week.

In some implementations, the method further includes, prior to the preemptively executing: receiving the particular 3P adapter at the client device and from a remote server, optionally responsive to the particular smart device, or an additional smart device of the 3P, being registered for the client device.

In some implementations, an additional 3P adapter, of the 3P adapters preemptively executed at the client device, is assigned to an additional particular communication channel that is distinct from the particular communication channel. In some of those implementations, the particular communication channel is a first radio channel of the client device and the additional particular communication channel is a second radio channel of the client device. For example, the first radio channel can be a Bluetooth channel and the second radio channel can be a Wi-Fi radio channel.

In some implementations, the particular specific command generated by the 3P adapter conforms to a particular protocol suite of the 3P adapter, and an additional 3P adapter, of the 3P adapters preemptively executed at the client device, generates commands that conform to an additional communication protocol suite that is distinct from the particular communication protocol suite. In some of those implementations the additional 3P adapter and the 3P adapter are both assigned to the particular communication channel. In some versions of those implementations, the particular protocol suite of the 3P adapter does not conform to an industry adopted standard, and can optionally be proprietary to the 3P.

In some implementations, the particular generic smart device control command is generated responsive to user interface input received at an additional client device, and identifying the particular generic smart device control command includes: receiving, via the local network communication, the particular generic smart device command from the additional client device. In some of those implementations, the method further includes, prior to identifying the particular generic smart device control command: determining a signal strength, for the particular communication channel, between the client device and the particular smart device; and transmitting data indicative of the signal strength. The particular generic smart device command can be received from the additional client device based on the transmitted data indicative of the signal strength.

In some implementations, selecting, from the plurality of 3P adapters and based on the particular smart device control command, the particular 3P adapter includes selecting the 3P adapter based on: the generic smart device control command further specifying an identifier for the 3P adapter, and/or the particular smart device specified by the generic smart device control command being assigned, at the client device, to the 3P adapter.

In some implementations, the method further includes: identifying, based on the generic smart device control command, an address for the particular smart device; and verifying that the particular specific command is addressed to only the address for the particular smart device. Transmitting the particular smart device control command using the selected particular communication channel can be contingent on the verifying.

In some implementations, a method implemented by one or more processors is provided and includes causing each assistant client device, of an ecosystem of assistant client devices connected to a secured Wi-Fi network that provides Internet access, to scan one or more communications channels for availability of an access point being broadcast by a smart device that lacks credentials for connecting to the secured Wi-Fi network. The method further includes determining, based on data generated by the scanning, that each of a plurality of assistant client devices, of the ecosystem of client devices, detected the availability of the access point. The method further includes selecting a single assistant client device from the plurality of assistant client devices that detected the availability of the access point. Selecting the single assistant client device from the plurality of assistant client devices can optionally be based at least in part on human interaction data for the single assistant client device. The method further includes causing the single assistant client device to: break a connection with the secured Wi-Fi network; after breaking the connection, establish a connection to the smart device via the access point, and securely share, with the smart device via the connection, the credentials for connecting to the secured Wi-Fi network.

These and other implementations of the technology disclosed herein can include one or more of the following features.

In some implementations, selecting the single assistant client device can be based at least in part on the human interaction data for the single assistant client device and can include: selecting the single assistant client device based on the human interaction data indicating that no user interface input has been received at the single assistant client device within a threshold amount of time; selecting the single assistant client device based on the human interaction data indicating that no audible output is being rendered by the assistant client device responsive to previously received user interface input; and/or selecting the single assistant client device based on the human interaction data indicating that the single assistant client device is utilized less frequently than any other of the plurality of assistant client devices that detected the setup access point.

In some implementations, the method further includes: receiving, via the secured Wi-Fi network, registration data from the smart device; and using the registration data to assign the smart device in a stored home graph associated with the ecosystem of assistant client devices. In some of those implementations, using the registration data to assign the smart device in the stored home graph includes: assigning the smart device in the stored home graph based on determining that biometric data, detected via one or more of the assistant client devices of the ecosystem, corresponds to an account associated with the stored home graph. For example, the stored home graph can be selected, based on the biometric data, in lieu of an additional home graph associated with the ecosystem of assistant client devices and associated with an additional account. In various implementations the biometric data includes voice data detected via one or more microphones of the one or more of the assistant client devices of the ecosystem.

In some implementations, a method implemented by one or more processors is provided and includes receiving, from each of a plurality of assistant client devices each having a corresponding short-range radio, a corresponding signal strength for a corresponding connection, via the short-range radio, to a smart device. The method further includes determining, based on the received signal strengths, that a given assistant device, of the plurality of assistant devices, is preferred for locally controlling the smart device. The method further includes identifying a generic smart device control command that specifies at least one smart device and at least one state to be altered at the smart device. The method further includes, based on determining the given assistant device is preferred for locally controlling the smart device, transmitting the generic smart device control command to the given assistant device to cause the given assistant device to: locally process the generic smart device control command to generate a specific command, that corresponds to the generic smart device control command, and that is directly interpretable by the smart device to effectuate alteration of the state at the smart device and transmit the specific command over the short-range radio to effectuate the alteration of the state at the smart device.

In some implementations, a method implemented by one or more processors is provided and includes causing each assistant client device, of an ecosystem of assistant client devices, to scan one or more communications channels for any unprovisioned smart devices. The method further includes determining, based on data generated by the scanning, that at least a given assistant client device, of the ecosystem of client devices, detected a given smart device that is unprovisioned. The method further includes causing the given assistant client device to utilize a locally stored third-party (3P) adapter to process registration data, provided by the given smart device in a format for the 3P, to generate registration information that is in a schema for an automated assistant associated with the assistant client device. The method further includes utilizing the registration information to register the given assistant client device in association with an account associated with the ecosystem of assistant client devices.

In some implementations, a method implemented by one or more processors is provided and includes receiving, from each of a plurality of assistant client devices each having a corresponding short-range radio, a corresponding signal strength for a corresponding connection, via the short-range radio, to a smart device. The method further includes determining, based on the received signal strengths, that a given assistant device, of the plurality of assistant devices, is preferred for locally controlling the smart device. The method further includes, based on determining the given assistant device is preferred for locally controlling the smart device, causing a particular third-party (3P) adapter, that corresponds to the smart device, to be downloaded to, and locally stored at, the given assistant device. The particular 3P adapter can be, for example, configured to locally process generic smart device control commands to generate specific commands that correspond to the generic smart device control commands and that are directly interpretable by the smart device to effectuate alteration of the state at the smart device.

These and other implementations of the technology disclosed herein can include one or more of the following features.

The method can further include, based on determining the given assistant device is preferred for locally controlling the smart device, causing the particular 3P adapter to be pre-emptively executed at the given assistant device.

In some implementations, the particular 3P adapter is downloaded to only the given assistant device, to the exclusion of other of the smart devices, based on determining that the given assistant device is preferred for locally controlling the smart device.

What is claimed is:

1. A method implemented by one or more processors of a client device executing an automated assistant client, the method comprising:
    identifying a generic smart device control command that specifies at least one smart device of a third-party (3P) and at least one state to be altered at the smart device, the generic smart device control command generated responsive to user interface input received at the client device;
    determining a reliable communications channel is not established between the client device and the smart device;
    responsive to determining the reliable communications channel is not established between the client device and the smart device:
        accessing a client devices to smart devices mapping, stored locally at the client device, to resolve an additional client device with an established reliable communications channel to the smart device; and
    transmitting, over a local network, the generic smart device control command to the additional client device to cause the additional client device to:
        select, from a plurality of 3P adapters, a particular 3P adapter for the generic smart device control command, wherein the particular 3P adapter is tailored by the 3P and integrates custom logic of the 3P, and wherein in selecting the particular 3P adapter the additional client device selects the particular 3P adapter responsive to the particular 3P adapter being assigned to the 3P and the generic smart device control command specifying the smart device of the 3P, and
        locally process the generic smart device control command, using the selected particular 3P adapter, to generate a specific command, that corresponds to the generic smart device control command, and that is directly interpretable by the smart device to effectuate alteration of the state at the smart device, and
        transmit the specific command over the established reliable communications channel to effectuate the alteration of the state at the smart device;
    wherein, prior to identifying the generic smart device control command, the additional client device pre-emptively receives and locally stores the particular 3P adapter responsive to the reliable communications channel being established with the smart device and the smart device being of the 3P, and
    wherein, prior to identifying the generic smart device control command, the additional client device pre-emptively executes, locally at the additional client device, the selected particular 3P adapter based on occurrence of a temporal period and one or more past occurrences of utilization of the particular 3P adapter during the temporal period.

2. The method of claim 1, further comprising:
    identifying an additional generic smart device control command that specifies at least one additional smart device and at least one additional state to be altered at the additional smart device, the additional generic smart device control command generated responsive to additional user interface input received at the client device;
    determining an additional reliable communications channel is established between the client device and the additional smart device;
    responsive to determining the additional reliable communications channel is established between the client device and the additional smart device:
        selecting an additional particular 3P adapter from a plurality of 3P adapters locally executable at the client device, the selecting based on the additional generic smart device control command;
    processing the additional generic smart device control command using the selected additional 3P adapter to generate an additional specific command, that corresponds to the additional generic smart device control command, and that is directly interpretable by the additional smart device to effectuate alteration of the additional state at the additional smart device; and
    transmitting, over the additional reliable communications channel established between the client device and the additional smart device, the additional specific command to effectuate the alteration of the additional state at the additional smart device.

3. The method of claim 2, further comprising, prior to the identifying the additional generic smart device control command:

preemptively executing, locally at the client device, the additional particular 3P adapters to reduce latency in processing the additional generic smart device control command using the selected additional particular 3P adapter to generate the additional specific command.

4. The method of claim 1, wherein accessing the client devices to smart devices mapping, stored locally at the client device, to resolve the additional client device with the established reliable communications channel to the smart device comprises:

determining, based on the client devices to smart devices mapping, that a given signal strength, between the additional client device and the smart device, is greatest amongst all client devices of the client devices to smart devices mapping.

5. The method of claim 1, wherein the established reliable communications channel to the smart device is a BLUETOOTH radio channel.

6. The method of claim 1, wherein the generic smart device control command is generated locally at the client device by locally processing user interface input received at the client device.

7. The method of claim 6, wherein the user interface input is interaction, at a touch-screen of the client device, with a rendered graphical user interface element corresponding to the smart device.

8. The method of claim 1, wherein the user interface input is a voice input received via at least one microphone of the client device, and wherein locally processing the user interface input comprises using a speech-to-text processor to convert the voice input into text, and performing natural language understanding on the text to generate the generic smart device control command.

9. The method of claim 1, further comprising:

receiving voice input via at least one microphone of the client device; and streaming the voice input to a remote automated assistant system;

wherein identifying the generic smart device control command comprises receiving the generic smart device control command from the remote automated assistant system responsive to streaming the voice input to the remote automated assistant system.

10. The method of claim 1, further comprising:

receiving, at the additional client device, an additional generic smart device control command that specifies an additional smart device, wherein the additional client device also has the established reliable communications channel to the additional smart device;

selecting, by the additional client device, from the plurality of 3P adapters assigned to the reliable communications channel, an alternate 3P adapter for the additional generic smart device control command;

locally processing the additional generic smart device control command, using the selected alternate 3P adapter, to generate an additional specific command, that corresponds to the additional generic smart device control command, and that is directly interpretable by the additional smart device; and transmitting the additional specific command over the established reliable communications channel to the additional smart device.

11. The method of claim 1, wherein in selecting, from the plurality of 3P adapters, the particular 3P adapter, the additional client device selects the particular 3P adapter based on the generic smart device control command indicating a particular 3P and the particular 3P adapter being assigned to the particular 3P.

12. The method of claim 1, wherein the particular 3P adapter includes one or more layers that do not conform with any industry standard protocol suite.

13. The method of claim 1, wherein the smart device firmware is created by a particular 3P and wherein the particular 3P adapter is proprietary to the particular 3P.

14. The method of claim 1, wherein determining whether the reliable communications channel is established between the client device and the smart device comprises one or both of:

determining whether any communications channel is established between the client device and the smart device; or determining whether a communications channel, established between the client device and the smart device, has at least a threshold signal strength.

15. The method of claim 14, wherein determining whether any communications channel is established and determining whether the communications channel has at least a threshold signal strength are each based on the client devices to smart devices mapping.

16. The method of claim 14, wherein determining whether any communications channel is established and whether the communications channel has at least a threshold signal strength are each based on one or more signals received via the communications channel subsequent to a most recent updating of the client devices to smart devices mapping.

* * * * *